(12) United States Patent
Swartz

(10) Patent No.: US 12,278,016 B1
(45) Date of Patent: Apr. 15, 2025

(54) TWO-STAGE PROCESS FOR HYDROGEN ISOTOPE LOADING IN A CATHODE MATERIAL

(71) Applicant: Mitchell R. Swartz, Weston, MA (US)

(72) Inventor: Mitchell R. Swartz, Weston, MA (US)

( * ) Notice: Subject to any disclaimer, the term of this patent is extended or adjusted under 35 U.S.C. 154(b) by 1272 days.

(21) Appl. No.: 16/501,365

(22) Filed: Mar. 30, 2019

(51) Int. Cl.
*C01B 4/00* (2006.01)
*G21B 1/21* (2006.01)
*G21B 3/00* (2006.01)

(52) U.S. Cl.
CPC ............... *G21B 3/00* (2013.01); *G21B 1/21* (2013.01); *G21B 3/002* (2013.01); *C01B 4/00* (2013.01)

(58) Field of Classification Search
CPC .......... G21B 3/006; G21B 3/00; G21B 3/002; G21B 1/115; G21B 1/05; G21B 1/15; Y02E 60/36; Y02E 60/50; Y02E 60/10; Y02E 60/32; Y02E 60/13; Y02E 30/10; C25B 9/00; C25B 9/70; C25C 3/02; C01B 6/04; C01B 4/00; C01B 5/02; C01B 2203/1041; C01B 3/508; F03H 1/00; G21C 3/38; H05H 1/46; H05H 1/54; G21J 1/00; B01D 59/12; B01D 59/38; B01D 59/14; B01D 69/12
See application file for complete search history.

(56) References Cited

U.S. PATENT DOCUMENTS

| | | | |
|---|---|---|---|
| 3,476,607 A * | 11/1969 | Carl | H01M 8/00 |
| | | | 429/444 |
| 3,682,806 A * | 8/1972 | Kinsella | C25D 13/22 |
| | | | 204/481 |
| 3,723,903 A * | 3/1973 | Paoli | H01S 5/0683 |
| | | | 372/28 |
| 3,791,871 A * | 2/1974 | Rowley | H01M 12/04 |
| | | | 429/118 |
| 5,036,031 A | 7/1991 | Patterson | |
| 5,215,631 A * | 6/1993 | Westfall | H01L 21/02562 |
| | | | 205/351 |
| 5,318,675 A * | 6/1994 | Patterson | G21B 3/00 |
| | | | 205/628 |
| 5,372,688 A | 12/1994 | Patterson | |
| 5,411,654 A | 5/1995 | Ahern et al. | |

(Continued)

FOREIGN PATENT DOCUMENTS

| | | | | |
|---|---|---|---|---|
| WO | WO-9010935 A1 * | 9/1990 | | G21B 3/002 |
| WO | WO-9014670 A1 * | 11/1990 | | G21B 3/00 |

OTHER PUBLICATIONS

Barnhart, B., "Defense Analysis Report", Defense Intelligence Agency, DIA-08-0911-003, Nov. 13, 2009. (Year: 2009).*

(Continued)

*Primary Examiner* — Darlene M Ritchie

(57) ABSTRACT

The present invention to control loaded isotopic fuel within a material uses a two-stage method which involves a first stage of electrode loading, and then, a second stage of sudden rapid ("catastrophic") flow of hydrogen within the metal. In one configuration means are provided to minimize the degradation of the loaded material. The apparatus includes a novel cathode, novel anode, and heat pipes, to improve reaction rates. The apparatus includes means to extract products. The apparatus includes intraelectrode barriers to obstruct the movement of the isotopic fuel. The apparatus includes thermal and electrical busses, and enables integration of smaller units into larger assemblies.

3 Claims, 18 Drawing Sheets

(56) References Cited

U.S. PATENT DOCUMENTS

| | | | |
|---|---|---|---|
| 5,647,970 | A | 7/1997 | Arata |
| 6,248,221 | B1* | 6/2001 | Davis ............... H01M 4/86 204/260 |
| 8,419,919 | B1 | 4/2013 | Boss et al. |
| 2002/0018538 | A1* | 2/2002 | Swartz ............... G21B 3/00 376/100 |
| 2009/0116604 | A1 | 5/2009 | Swartz |
| 2011/0142183 | A1* | 6/2011 | Swartz ............... G21B 3/00 976/DIG. 1 |

OTHER PUBLICATIONS

U.S. Appl. No. 07/339,976, filed Apr. 18, 1989.
U.S. Appl. No. 12/154,712.
U.S. Appl. No. 10/761,536, filed Jan. 22, 2004 Swartz, M.R.
U.S. Appl. No. 09/568,728, filed Dec. 23, 2003 Swartz, M.R.
Swartz, M., Bass, R.W., "Empirical System Identification (ESID) and Optimal Control of Lattice-AssistedNuclear Reac-tors," Proceedings of the 14th International Conference on Con-densed Matter Nuclear Science and the 14th International Con-ference on Cold Fusion (ICCF-14), Ed D.J. Nagel and M.E.Melich, ISBN: 978-0-578-06694-3, 497, (2010).
Swanz, M., "Survey of the Observed Excess Energy and Emis-sions In Lattice Assisted Nuclear Reactions", Journal of Scien-tific Exploration, 23, 4, 419-436 (2009).
Swartz, M., G. Vemer, "Excess Heat from Low Electrical Conductivity Heavy Water Spiral-Wound Pd/D2O/Pt and Pd/D2O-PdCl2/Pt Devices", Condensed Matter Nuclear Science, Pro-ceedings of ICCF-10, eds. Peter L. Hagelstein, Scott, R. Chubb, World Scientific Publishing, NJ, ISBN 981-256-564-6, 29-44; 45-54 (2006).
Swartz, M, "Consistency of the Biphasic Nature of Exces Enthalpy in Solid State Anomalous Phenomena with the Quasi-1-Dimensional Model of Isotope Loading into a Material", Fusion Technology, 31, 63-74 (1997).
U.S. Appl. No. 07/371,937, filed Jun. 1989 Swartz, M.R.
U.S. Appl. No. 09/750,765, filed Sep. 17, 1991 Swartz, M.R.
Vemer, G., M. Swartz, P. Hagelstein, Summary report: 'Introduction to Cold Fusion'—IAP course at the Massachusetts Insti-tute of Technology, Current Science, 108, 4, 653 (2015); http://www.currentscience.ac.in/Volumes/108/04/0653.pdf.
Swanz M., G.Vemer Bremsstrahlung—Relative Role In Hot And Cold Fusion And Impact Upon Potential Isotopic Fuels, J. New Energy 3, No. 4, (1998), p. 90-101 www.iscmns.org/FIC/J/JNE3N4.pdf.
U.S. Appl. No. 12/4775643, filed Dec. 15, 2008 Swartz, M.R.
U.S. Appl. No. 12/802,165, filed Jun. 1, 2010 Swartz, M.R.
Swartz M., Isotopic Fuel Loading Coupled to Reactions at an Electrode, Proc. ICCF4 2, (1993), p. 429; Fusion Technology, 26, 4T, 74-77 (1994); www.lenr-canr.org/acrobat/EPRIproceedinga.pdf.
Swartz, M., "Quasi-One-Dimensional Model of Electrochemical Loading of Isotopic Fuel into a Metal", Fusion Technology, 22, 2, 296-300 (1992).
Swartz U.S. Appl. No. 12/154,712, filed May 2009.
Swartz, M. P. Hagelstein, G. Verner, Impact of Electrical Ava-lanche Through a ZrO2—NiD Nanostructured CF/LANR Com-ponent on its Incremental Excess Power Gain, ICCF-19, Padua, Italy (Apr. 16, 2015).
Swartz, M. G. Verner, J. Tolleson, P. Hagelstein, Dry, preloaded NANOR®-type CF/LANR components, Current Science, 108, 4, 595 (2015); http://www.currentscience.ac.in/Volumes/108/04/0595.pdf.
Swartz M., Verner, G., et al., Imaging of an Active NANOR®-type LANR Component using CR-39, J. Condensed Matter Nucl. Sci. 15, (2015), p. 81; www.iscmns.org/CMNS/JCMNS-Vol15.pdf.
Swartz M., Incremental High Energy Emission from a ZrO2—PdD Nanostructured Quantum Electronic Component CF/LANR, J. Condensed Matter Nucl. Sci. 15, (2015), p. 92; www.iscmns.org/CMNS/JCMNS-Vol15.pdf.

Swartz M., Verner, G., et al., Amplification and Restoration of Energy Gain Using Fractionated Magnetic Fields on ZrO2—PdD Nanostructured Components, J. Condensed Matter Nucl. Sci. 15, (2015), p. 66; www.iscmns.org/CMNS/JCMNS-Vol15.pdf.
Swartz M. R., Hagelstein P.I., Demonstration of Energy Gain from a Preloaded ZrO2—PdD Nanostructured CF/LANR Quan-tum Electronic Device at MIT, J. Condensed Matter Nucl. Sci. 13, (2014), p. 516 www.iscmns.org/CMNS/JCMNS-Vol13.pdf.
Swartz M. R., Vemer G., et al., Energy Gain From Preloaded ZrO2—PdNi—D Nanostructured CF/LANR Quantum Electronic Components, J. Condensed Matter Nucl. Sci. 13, (2014), p. 528 www.iscmns.org/CMNS/JCMNS-Vol13.pdf.
Swartz, M.R., "Breakeven from LANR Phusor Device Systems: Relative Limitations of Thermal Loss in Feedback Loop",in Proceedings of the 14th International Conference on Condensed Matter Nuclear Science, ibid. (2010).
Swartz M., Vemer G., et al., Non-Thermal Near-IR Emission from High Impedance and Codeposition LANR Devices, Proc. ICCF14 1, (2008), p. 343; Ed D.J. Nagel and M.E.Melich, ISBN: 978-0-578-06694-3, 343, (2010); www.iscmns.org/iccf14/ProcICCF14a.pdf.
Swartz, M.R., "Optimal Operating Point Manifolds in Active, Loaded Palladium Linked to Three Distinct Physical Regions", in Proceedings of the 14th International Conference on Condensed Matter Nuclear Science, ibid. (2010).
Swartz M., Excess Power Gain using High Impedance and Co-depositional LANR DevicesMonitored by Calorimetry, Heat Flow, and Paired Stirling Engines, Proc. ICCF14 1, (2008), p. 123; Ed D.J. Nagel and M.E.Melich, ISBN: 978-0-578-06694-3, 123, (2010); www.iscmns.org/iccf14/ProcICCF14a.pdf.
Swartz, M., Bass, R.W., "Empirical System Identification (ESID) and Optimal Control of Lattice-AssistedNuclear Reac-tors," Proceedings of the 14th International Conference on Con-densed Matter Nuclear Science and the 14th International Con-ference on Cold Fusion (ICCF-14), Ed D.J. Nagel and M.E.Melich, ISBN: 978-0-578-06694-3, 497, (2010).
Swartz, M., "Survey of the Observed Excess Energy and Emis-sions In Lattice Assisted Nuclear Reactions", Journal of Scien-tific Exploration, 23, 4, 419-436 (2009).
Swartz, M., G. Verner, "Excess Heat from Low Electrical Conductivity Heavy Water Spiral-Wound Pd/D20/Pt and Pd/D20-PdCI2/Pt Devices", Condensed Matter Nuclear Science, Pro- ceedings of ICCF-10, eds. Peter L. Hagelstein, Scott, R. Chubb, World Scientific Publishing, NJ, ISBN 981-256-564-6, 29-44; 45-54 (2006).
Swartz, M, "Consistency of the Biphasic Nature of Excess Enthalpy in Solid State Anomalous Phenomena with the Quasi-1-Dimensional Model of Isotope Loading into a Material", Fusion Technology, 31, 63-74 (1997).
Swartz, M., "Photoinduced Excess Heat from Laser-Irradiated Electrically-Polarized Palladium Cathodes in D2O", Condensed Matter Nuclear Science, Proc. ICCF-10, eds. Peter L. Hagel-stein, Scott Chubb, NJ, ISBN 981-256-564-6, 213-226 (2006).
Swartz. M., "The Impact of Heavy Water (D2O) on Nickel-Light Water Cold Fusion Systems", Proceedings of the 9th In-ternational Conference on Cold Fusion (Condensed Matter Nu-clear Science), Beijing, China, Xing Z. Li, pp. 335-342. May 2002.
Verner, G., M. Swartz, P. Hagelstein, Summary report: 'Introduction to Cold Fusion'—IAP course at the Massachusetts Insti-tute of Technology, Current Science, 108, 4, 653 (2015); http://www.currentscience.ac.in/Volumes/108/04/0653.pdf.
Swartz M., G. Verner Bremsstrahlung—Relative Role In Hot And Cold Fusion And Impact Upon Potential Isotopic Fuels, J. New Energy 3, No. 4, (1998), p. 90-101 www.iscmns.org/FIC/J/JNE3N4.pdf.
Swartz. M., "Catastrophic Active Medium Hypothesis of Cold Fusion" vol. 4. Proceedings: "Fourth Interna-tional Conference on Cold Fusion" sponsored by EPRI and the Office of Naval Research (1994).
Swartz. M., "Codeposition Of Palladium And Deuterium", Fu-sion Technology, 32, 126-130 (1997).
Swartz, M., "Phusons in Nuclear Reactions in Solids", Fusion Technology, 31, 228-236 (Mar. 1997).

(56) References Cited

OTHER PUBLICATIONS

Swartz, M., "Some Lessons from Optical Examination of the PFC Phase-II Calormetric Curves", 2, Proceedings: "Fourth International Conference on Cold Fusion", 19-1, EPRI, Office of Naval Research, Dec. 1993.
Swartz, M., G. Verner, "Metamaterial Function of Cath-odes Producing Hydrogen Energy and Deuteron Flux", in Proceedings of the 14th International Conference on Condensed Matter Nuclear Science, ibid. (2010).
Swartz M., Isotopic Fuel Loading Coupled to Reactions at an Electrode, Proc. ICCF4 2, (1993), p. 429; Fusion Technology, 26, 4T, 74-77 (1994); www.lenr-cann.org/acrobat/EPRIproceedinga.pdf.
Swartz, M., "Quasi-One-Dimensional Model of Electrochemica Loading of Isotopic Fuel into a Metal", Fusion Technology, 22, 2, 296-300 (1992).
Swartz, M., with Marwan, J, M. C. H. McKubre, F. L. Tanzella, P. L. Hagelstein, M. H. Miles, Edmund Storms, Y. Iwamura, P. A. Mosier-Boss and L. P. G. Forsley, "A new look at low-energy nuclear reaction (LENR) research: a response to Shanahan", *J. Environ. Monit.*, (2010).
Defense Analysis Report DIA 8-0911-003 and dated Nov. 13, 2009 on LANR.
Defense Threat Reduction Agency—DTRA Report on LANR and Swartz; makin LANR/CF open to DTRA grants (2006).
Swartz M. R., Oscillating Excess Power Gain and Co-erced Magnetic Domains in M-NANOR-type CF/LANR Components, J. Condensed Matter Nucl. Sci. 22, 35-46 (2017).
Swartz, M. R, Peter L. Hagelstein, Increased PdD anti-Stokes Peaks are Correlated with Excess Heat Mode, J. Condensed Matter Nucl. Sci. 24, 130-145 (2017).
M. Hansen, Constitution of Binary Alloys, McGraw-Hill Book Co., Inc (1958).
Hampel, C.A., Editor, Rare Metals Handbook, pub-lished by Reinhold Publishing Corp, (1954), pp. 312, 319, 322-325.
Morrish, A.H., The Physical Principles of Mag-netism, John Wiley & Sons, Inc. NY (1966), pp. 69, pp. 228-229.
C. J. Smithells, Metals Reference Book, Butter-worths Scientific, (1949).
Uhlig, H. H., Corrosion and Corrosion Control, pub-lished by John Wiley & Sons, Inc., (1971), pp. 142-143.
U.S. Pat. No. 8,129,656, "Method of Producing Thermal En-ergy" issued Mar. 6, 2012.
U.S. Appl. No. 8,603,405, "Power Units Based on Dislocation Site Technigues", issued on Dec. 10, 2013.
U.S. Pat. No. 8,440,165, "Dislocation Site Density Tech-niques", issued on May 13, 2013 U.S. Pat. No. 8,227,020 U.S. Pat. No. 8,526,560 are members of the same family.
U.S. Pat. No. 8,485,791, "Ceramic Element", was issued on Jul. 16,2013 U.S. Pat. No. 8,801,977, teaching an "Enhanced Alpha Par-ticle Emitter", issued on Aug. 12, 2014.
U.S. Pat. No. 8,508,057, "Power Generator", issued on Aug. 13, 2013.
U.S. Pat. No. 7,893,414, "Apparatus and Method for Absorp-tion of Incident Gamma Radiation and its Conversion to Out-going Radiation at Less Penetrating, Lower Energies and Fre-quencies", issued Feb. 22, 2011.

\* cited by examiner

TWO-STAGE PROCESS FOR HYDROGEN ISOTOPE LOADING IN A CATHODE MATERIAL

This is a Continuation of Ser. No. 09/750,765 Filed: Dec. 28, 2000 which is a Continuation of Ser. No. 07/760,970 Filed: Sep. 17, 1991 Mar. 30, 2019

CROSS REFERENCE TO RELATED APPLICATIONS

This is a Continuation of Ser. No. 09/750,765 Filed: Dec. 28, 2000 "METHOD AND APPARATUS TO CONTROL LOADED ISOTOPIC FUEL WITHIN A MATERIAL" which is a Continuation of Ser. No. 07/760,970 Filed: Sep. 17, 1991 "SYSTEMS TO CONTROL NUCLEAR FUSION OF ISOTOPIC FUEL WITHIN A MATERIAL"

STATEMENT REGARDING FEDERALLY SPONSORED RESEARCH OR DEVELOPMENT

Not Applicable

DESCRIPTION OF ATTACHED APPENDIX

Peer-reviewed publications, Exhibits, DIA and DTRA Reports as Declarations attesting to Operability and Utility and the like (37 CFR 1.63).

The present invention relates to processes and systems involving loading, such as palladium internally filling ["loading"] with deuterons or deuterium (an isotope of hydrogen), but it has relevance as well, to storage devices, to energy systems, and to metallurgy.

The present invention also relates to electrochemical reactions in or about metals, such as palladium which has been electrochemically loaded with deuterium, but it has relevance as well, to hydrogen storage, fuel cells, nuclear fusion, and other reactions in pressure-loaded metals such as titanium or palladium filled with deuterium, and to the broader field of metallurgy and engineering in or about metals, including Groups IVb, Vb, and some rare earths.

The following journal articles and papers and may be used by way of background material and to supplement this specification: By way of background and to place reasonable limits on the size of this disclosure, the following publications are noted:

OTHER PATENTS AND PUBLICATIONS

| | |
|---|---|
| | Pat. 5,647,970 7/17/1997 |
| | Patterson (5036031, 5318675, 5372688, 5036031) |
| | Ahern U.S. Pat. No. 5,411,654 |
| | Forsley U.S. Pat. No. 8,419,919 |
| | U.S. Pat. No. 8,129,656, "Method of Producing Thermal Energy" issued Mar. 6, 2012 |
| | U.S. Pat. No. 8,603,405, "Power Units Based on Dislocation Site Techniques", issued on Dec. 10, 2013 |
| | U.S. Pat. No. 8,440,165, "Dislocation Site Density Techniques", issued on May 13, 2013 |
| | U.S. Pat. No. 8,485,791, "Ceramic Element", Jul. 16, 2013 |
| | U.S. Pat. Nos. 8,227,020 and 8,526,560 |
| | U.S. Pat. No. 8,801,977, "Enhanced Alpha Particle Emitter Aug. 12, 2014 |
| | U.S. Pat. No. 8,508,057, "Power Generator", Aug. 13, 2013 |
| | U.S. Pat. No. 7,893,414, , issued Feb. 22, 2011 |
| | U.S. Pat. 9,540,960 B2, "Low energy nuclear thermoelectric system", issued Jan. 10, 2017 |
| | DIA (Defense Intelligence Agency) Report [DIA-08-09U-003, Nov. 13, 2009] |
| | DTRA Report [Defense Threat Reduction Agency High Energy Science and Technology Assessment Jun. 29, 2007 |
| Hansen, | Constitution of Binary Alloys, McGraw-Hill Book Co., Inc., 790-793, (1958). |
| | C. A. HAMPEL, Rare Metals Handbook, Reinhold Pub Corp, (1954). |
| | C. J. SMITHELLS, Metals Reference Book, Butterworths Scientific, (1949). |
| | H. H. UHLIG, Corrosion and Corrosion Control, John Wiley & Sons, Inc., (1971). |
| Miles, M.M., | "Heat and Helium Production in Cold Fusion Experiments", Conf Proc., Vol. 33, Editor - Bressani, "The Science of Cold Fusion", 363-372 (1991). |
| Swartz(92) | Swartz, M.R., "Quasi-One-Dimensional Model of Electrochemical Loading of Isotopic Fuel into a Metal", Fusion Technology, 22, 2, 296-300 (1992) |
| Swartz(97A) | Swartz, M.R., "Consistency of the Biphasic Nature of Excess Enthalpy in Solid State Anomalous Phenomena with the Quasi-1-Dimensional Model of Isotope Loading", Fusion Technology, 31, 63-74 (1997) |
| Swartz(94) | Swartz, M.R., "Isotopic Fuel Loading Coupled To Reactions At An Electrode", Fusion Technology, 26, 4T, 74-77 (1994) |
| Swartz(97B) | Swartz, M.R., "Codeposition Of Palladium And Deuterium", Fusion Technology, 32. 126-130 (1997) |
| Swartz(97C) | Swartz, M.R., "Phusons in Nuclear Reactions in Solids", Fusion Technology, 31, 228-236 (March 1997). |
| Swartz(98A) | Swartz, M.R., "Improved Electrolytic Reactor Performance Using p-Notch System Operation and Gold Anodes", Trans American Nuclear Ass, 1998 (ISSN:0003-018X publisher LaGrange, Ill) 78, 84-85 |

| | -continued |
|---|---|
| Swartz(98B) | Swartz. M., "Patterns of Failure in Cold Fusion Experiments", Proceedings of the 33RD Intersociety Engineering Conference on Energy Conversion, IECEC-98-1229, Colorado Springs, CO, August 2-6, (1998). |
| Swartz(99) | Swartz, M.R., G. Verner, "Bremsstrahlung in Hot and Cold Fusion", J New Energy, 3, 4, 90-101 (1999). |
| Swartz(00) | Swartz, M.R., "Control of Low Energy Nuclear Systems Through Loading and Optimal Operating Point", ANS/ 2000 International Winter Meeting, Nov. 12-17, 2000, Washington, D.C. (2000) Transactions |
| Swartz(02) | Swartz, M.R., "The Impact of Heavy Water ($D_2O$) on Nickel-Light Water Cold Fusion Systems", Proceedings of the 9th International Conference on Cold Fusion (Condensed Matter Nuclear Science), Beijing, China, Xing Z. Li, pages 335-342. May (2002). |
| Swartz(03A)/ 06 | Swartz, M.R., G. Verner, "Excess Heat from Low Electrical Conductivity Heavy Water Spiral-Wound $Pd/D_2O/Pt$ and $Pd/D_2O-PdCl_2/Pt$ Devices", Condensed Matter Nuclear Science, Proceedings of ICCF-10, eds. Peter L. Hagelstein, Scott, R. Chubb, World Scientific Publishing, NJ, ISBN 981-256-564-6, 29-44; 45-54 (2006). |
| Swartz(03B)/ (06) | Swartz, M.R., "Photoinduced Excess Heat from Laser-Irradiated Electrically-Polarized Palladium Cathodes in $D_2O$", Condensed Matter Nuclear Science, Proc. ICCF-10, eds. Peter L. Hagelstein, Scott Chubb, NJ, ISBN 981-256-564-6, 213-226 (2006). |
| Swartz(05) | Swartz, M.R., G. Verner, "Dual Ohmic Controls Improve Understanding of 'Heat after Death'", Transactions American Nuclear Society, vol. 93, ISSN:0003-018X, 891-892 (2005). |
| Swartz(06C) | Swartz, M.R., "Can a $Pd/D_2O/Pt$ Device be Made Portable to Demonstrate the Optimal Operating Point?", Condensed Matter Nuclear Science, Proceedings of ICCF-10, World Scientific Publishing, NJ, ISBN 981-256-564-6, 29-44; 45-54 (2006). |
| Swartz(06D) | Swartz, M.R. "Impact of an Applied Magnetic Field on the Electrical Impedance of a LANR Device", Volume 4 JCMNS, Proceedings of the March 2010, New Energy Technology Symposium held at the 239th American Chemical Society National Meeting and Exposition in San Francisco (2011). |
| Swartz(09A) | Swartz, M.R. "Survey of the Observed Excess Energy and Emissions In Lattice Assisted Nuclear Reactions", Journal of Scientific Exploration, 23, 4, 419-436 (2009) |
| Swartz(09B) | Swartz, M.R., "Excess Heat and Electrical Characteristics of Type "B" Anode-Plate High Impedance Phusor-type LANR Devices", American Chemical Society, Salt Lake City, UT, Journal of Scientific Exploration, 23, 4, 491-495 (2009). |
| Swartz(10A) | Swartz, M.R., Excess Power Gain using High Impedance and Codepositional LANR DevicesMonitored by Calorimetry, Heat Flow, and Paired Stirling Engines, Proc. ICCF14 1, (2008), p 123 ISBN: 978-0-578-06694-3, 123, (2010); www.iscmns.org/iccf14/ProcICCF14a.pdf |
| Marwan(10) | Marwan, J, M. C. H. McKubre, F. L. Tanzella, P. L. Hagelstein, M. H. Miles, Edmund Storms, Y. Iwamura, P. A. Mosier-Boss and L. P. G. Forsley, "A new look at low-energy nuclear reaction (LENR) research: a response to Shanahan", J. Environ. Monit., (2010) |
| Swartz(10B) | Swartz, M., "Electrical Breakeven from LANR Phusor Device Systems: Relative Limitations of Thermal Loss in Feedback Loop", Proceedings of the 14th International Conference onCondensed Matter (ICCF-14), Ed D.J. Nagel and M.E.Melich, ISBN: 978-0-578-06694-3, 689, (2010). |
| Swartz(10C) | Swartz, M.R., Forsley L., Analysis and Confirmation of the 'Superwave-as-Transitory-OOP-Peak' Hypothesis, Proc. ICCF14 2, (2008), p 653; Ed D.J. Nagel and M.E.Melich, ISBN: 978-0-578-06694-3, 653, (2010); www.iscmns.org/iccf14/ProcICCF14b.pdf |
| Swartz(10D) | Swartz, M., Optimal Operating Point Manifolds in Active, Loaded Palladium Linked to Three Distinct Physical Regions, Proc. ICCF14 2, (2008), p 639; Ed D.J. Nagel and M.E.Melich, ISBN: 978-0-578-06694-3, 639, (2010); www.iscmns.org/iccf14/ProcICCF14b.pdf |
| Swartz(10E) | Swartz, M., Verner G., Weinberg, A., Non-Thermal Near-IR Emission from High Impedance and Codeposition LANR Devices, Proc. ICCF14 1, (2008), p 343; Ed D.J. Nagel and M.E.Melich, ISBN: 978-0-578-06694-3, 343, (2010); www.iscmns.org/iccf14/ProcICCF14a.pdf |
| Swartz(10F) | Swartz, M., Verner G., The Phusor ®-type LANR Cathode is a Metamaterial Creating Deuteron Flux for Excess Power Gain, Proc. ICCF14 2, (2008), p 458; Ed D.J. Nagel and M.E.Melich, ISBN: 978-0-578-06694-3, 458, (2010); |
| Swartz(10G) | Swartz, M., Bass, R. W., "Empirical System Identification (ESID) and Optimal Control of Lattice-AssistedNuclear Reactors," Proceedings of the 14th International Conference on Condensed Matter Nuclear Science and the 14th International Conf Cold Fusion (ICCF-14), Ed D.J. Nagel and M.E.Melich, ISBN: 978-0-578-06694-3, 497, (2010). |
| Verner (15) | Verner, G., M. Swartz, P. Hagelstein, Summary report: 'Introduction to Cold Fusion'-IAP course at the Massachusetts Institute of Technology, Current Science, 108, 4, 653 (2015); http://www.currentscience.ac.in/Volumes/108/04/0653.pdf |

-continued

| | |
|---|---|
| Verner (17) | Verner, G., M. Swartz, P. Hagelstein, Development of a Science and Engineering CF Course, J. Condensed Matter Nucl. Sci. 22, 47-52 (2017) |
| Swartz(11) | Swartz M. R., LANR Nanostructures and Metamaterials Driven at their Optimal Operating Point, J. Condensed Matter Nucl. Sci. 6, (2012), p 149; 3rd Vol LANR/LENR Sourcebook, October 21 (2011); www.iscmns.org/CMNS/JCMNS-Vol6.pdf |
| Swartz(14B) | Swartz M. R., Hagelstein P.I., Demonstration of Energy Gain from a Preloaded ZrO2-PdD Nanostructured CF/LANR Quantum Electronic Device at MIT, J. Condensed Matter Nucl. Sci. 13, (2014), p 516 www.iscmns.org/CMNS/JCMNS-Vol13.pdf |
| Swartz(14A) | Swartz. M., G.Verner, J.Tolleson, "Energy Gain From Preloaded ZrO2-PdNi-D Nanostructured CF/LANR Quantum Electronic Components, J. Condensed Matter Nucl. Sci., 2014, 13, 528, www.iscmns.org/CMNS/JCMNS-Vol13.pdf |
| Swartz(15A) | Swartz M. R., Incremental High Energy Emission from a ZrO2-PdD Nanostructured Quantum Electronic Component CF/LANR, J. Condensed Matter Nucl. Sci. 15, p 92 (2015); |
| Swartz(15B) | Swartz M. R., Verner, G., Tolleson, J., Wright, L., Goldbaum, R., Hagelstein, P., Amplification and Restoration of Energy Gain Using Fractionated Magnetic Fields on Zr02-PdD Nanostructured Components, J. Condensed Matter Nucl. Sci. 15, (2015), p 66; www.iscmns.org/CMNS/JCMNS-Vol15.pdf |
| Swartz(15C) | Swartz M. R., Verner, G., Tolleson, J., Wright, L., Goldbaum, R., Hagelstein, P., Imaging of an Active NANOR ®-type LANR Component using CR-39, J. Condensed Matter Nucl. Sci. 15, (2015), p 81; www.iscmns.org/CMNS/JCMNS-Vol15.pdf |
| Swartz(15D) | Swartz, M. R., G. Verner, J. Tolleson, P. Hagelstein, Dry, Preloaded NANOR ®-type CF/LANR components, Current Science, 108, 4, 595 (2015); http://www.currentscience.ac.in/Volumes/108/04/0595.pdf |
| Swartz(16A) | Swartz, M. R. P. Hagelstein, G. Verner, Impact of Electrical Avalanche Through a ZrO2-NiD Nanostructured CF/LANR Component on its Incremental Excess Power Gain", ICCF-19, JCMNS, 19, (2016) |
| Swartz(16B) | Swartz, M.R., "Optical Detection of Phonon Gain Distinguishes an Active Cold Fusion/LANR Component", JCMNS, 20, 29-53 (2016); www.iscmns.org/CMNS/JCMNS-Vol20.pdf |
| Swartz(17A) | Swartz M. R., Oscillating Excess Power Gain and Coerced Magnetic Domains in M-NANOR-type CF/LANR Components, J. Condensed Matter Nucl. Sci. 22, 35-46 (2017) |
| Swartz(17B) | Swartz, M. R, Peter L. Hagelstein, Increased PdD anti-Stokes Peaks are Correlated with Excess Heat Mode, J. Condensed Matter Nucl. Sci. 24, 130-145 (2017) |

Controlled reactions in loaded metals offers the possibility of more efficient and inexpensive energy. Thermal generation through reactions of nickel or palladium and isotopes of hydrogen is a proven technology with a wide range of well-established utilities. U.S. Pat. No. 8,129,656, covering a "Method of Producing Thermal Energy" issued Mar. 6, 2012 discusses thermal generation through fusion of a metallic cathode material (such as nickel) in an atmosphere containing hydrogen. A group of patents relating to thermal generation by these reactions has also been granted in U.S. Pat. No. 8,603,405, covering "Power Units Based on Dislocation Site Techniques", issued on Dec. 10, 2013 which claims thermal generation with a gas-loaded reaction generator; and U.S. Pat. No. 8,440,165, covering "Dislocation Site Density Techniques", issued on May 13, 2013 which claims reactions of metallic nanoparticles (such as nickel) and hydrogen isotopes. U.S. Pat. Nos. 8,227,020 and 8,526,560 are members of the same family.

U.S. Pat. No. 8,485,791, covering a "Ceramic Element", was issued on Jul. 16, 2013 and claims a heating element which utilizes the reactions of hydrogen and nickel to generate heat. U.S. Pat. No. 8,801,977, teaching an "Enhanced Alpha Particle Emitter", issued on Aug. 12, 2014, claims thermal generation resulting from reactions of hydrogen and nickel.

U.S. Pat. No. 8,508,057, covering a "Power Generator", was issued on Aug. 13, 2013 claims electricity generated through reactions of hydrogen and nickel.

U.S. Pat. No. 7,893,414, covering an "Apparatus and Method for Absorption of Incident Gamma Radiation and its Conversion to Outgoing Radiation at Less Penetrating, Lower Energies and Frequencies", issued Feb. 22, 2011, claims reactions of nickel and hydrogen.

Chauvin in U.S. Pat. No. 9,540,960 B2, issued Jan. 10, 2017 claims a low energy nuclear thermoelectric system.

However, there are problems. First, the desired reactions are not well controlled. The proven difficulties of loading, the slow initiation of the desired reactions, and the difficulty in controlling the reactions has limited research and development of this technology.

Second, prior to the desired reactions, the cathodes must be filled with deuterons to concentrations which require significant times of charging.

Third, palladium, the preferred metal of these reactions, is expensive.

Fourth, the rates of the desired reactions are very low in the steady state.

Accordingly, it is a principal object of the present invention to provide a novel method and system to control and enhance desired loading reactions.

Another object of the present invention is to provide a novel method and system to control the loading, and flow of loaded materials.

Another object of the present invention is to provide a novel method to fill cathodes with deuterons with shorter times of charging.

Another object of the present invention is to minimize the required quantity of expensive palladium or titanium used.

Another object of the present invention is to provide a novel method to improve the removal of the excess heat generated.

Another object is to combine and integrate small energy producing units into a larger assembly so as to enable a substantial reactor to be built.

Another object is to control reactions in and about metals which have been loaded with deuterium from the gaseous state.

These and still further objects are addressed hereinafter.

The foregoing objects are achieved in a system which includes in combination:

a novel two-stage loading device, containing in combination:

a cathode able to be charged from a novel anode with deuterons at a high efficiency, a deuteron impermeable barrier to increase the rate of desired reactions, a thermal pipe to remove heat, a modified solution consisting of a gel containing lithium deuteroxide and palladium deuteroxide, a structural barrier to minimize catastrophic loss of said cathode, a composite character of said cathode to minimize catastrophic loss of said cathode, a structural barrier external to said cathode to minimize catastrophic loss of said cathode, and an external casing to provide uniformity and plug-in-ability of said device into, a superassembly which allows integration of the smaller energy producing devices.

The invention is hereafter described with reference to the accompanying drawings in which:

FIG. 1 symbolically shows the compartments used to analyze an electrochemical reactor. The cathode is dissected into four regions, and three compartments within the metal itself. The flow of deuterons is shown by arrows.

Figure 6:
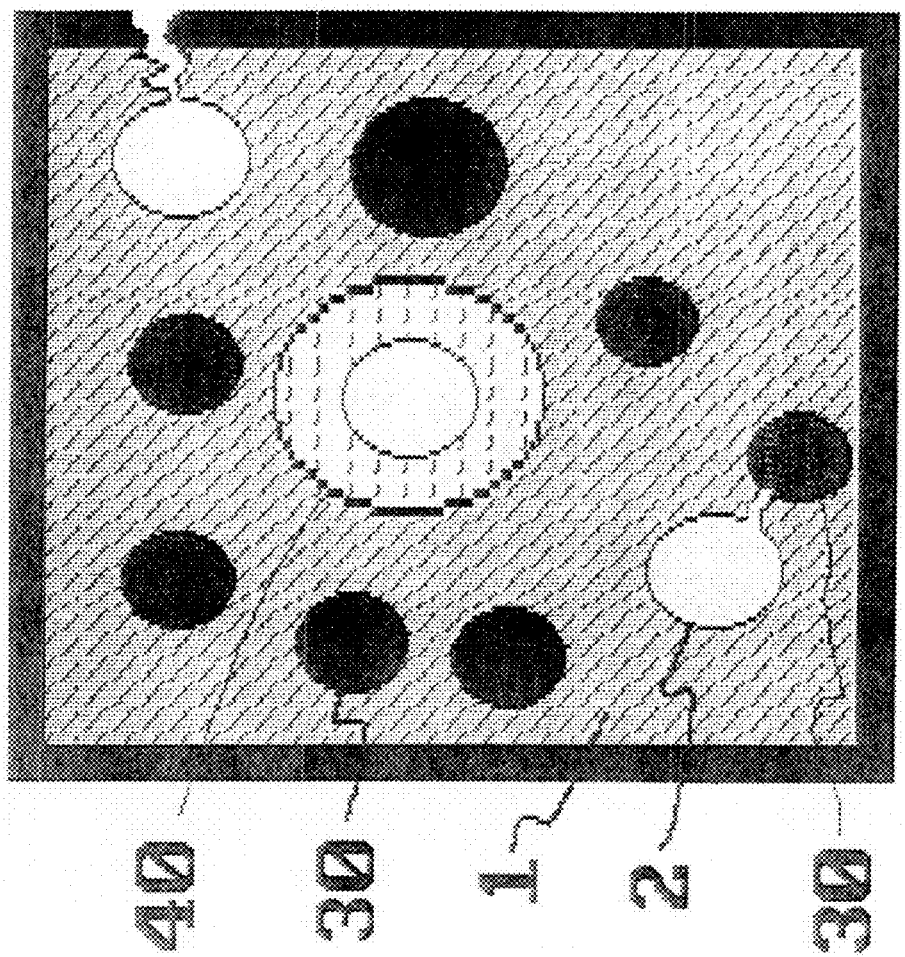

FIG. 6 a simplified two-dimensional diagram which schematically shows the effect of providing intracathodic materials to quench mechanical crack propagation and subsequent breakdown of said cathode.

Figure 7:
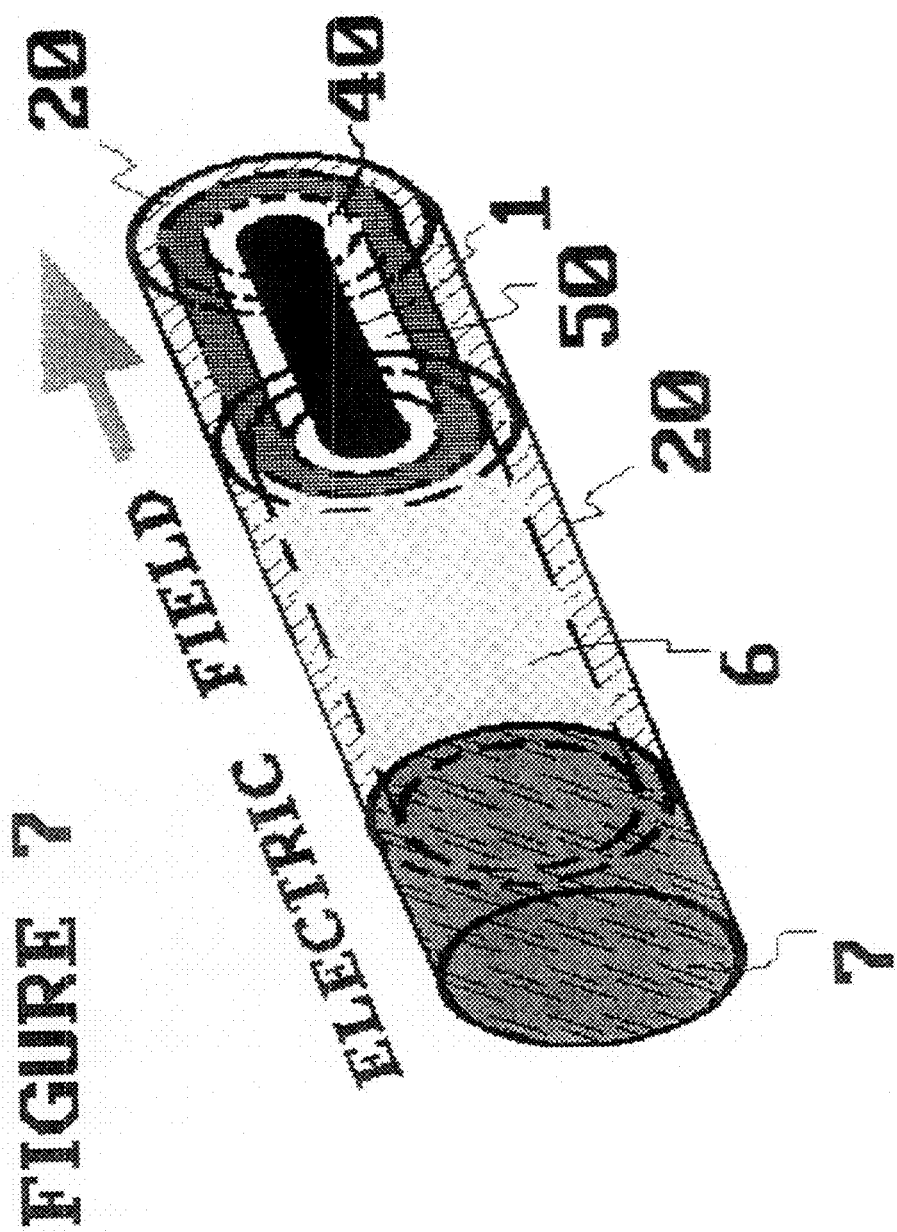

FIG. 7 shows a device with axial electrochemical loading of a cylindrical cathode, surrounded by a heat pipe, and a expansion barrier.

Figure 8:
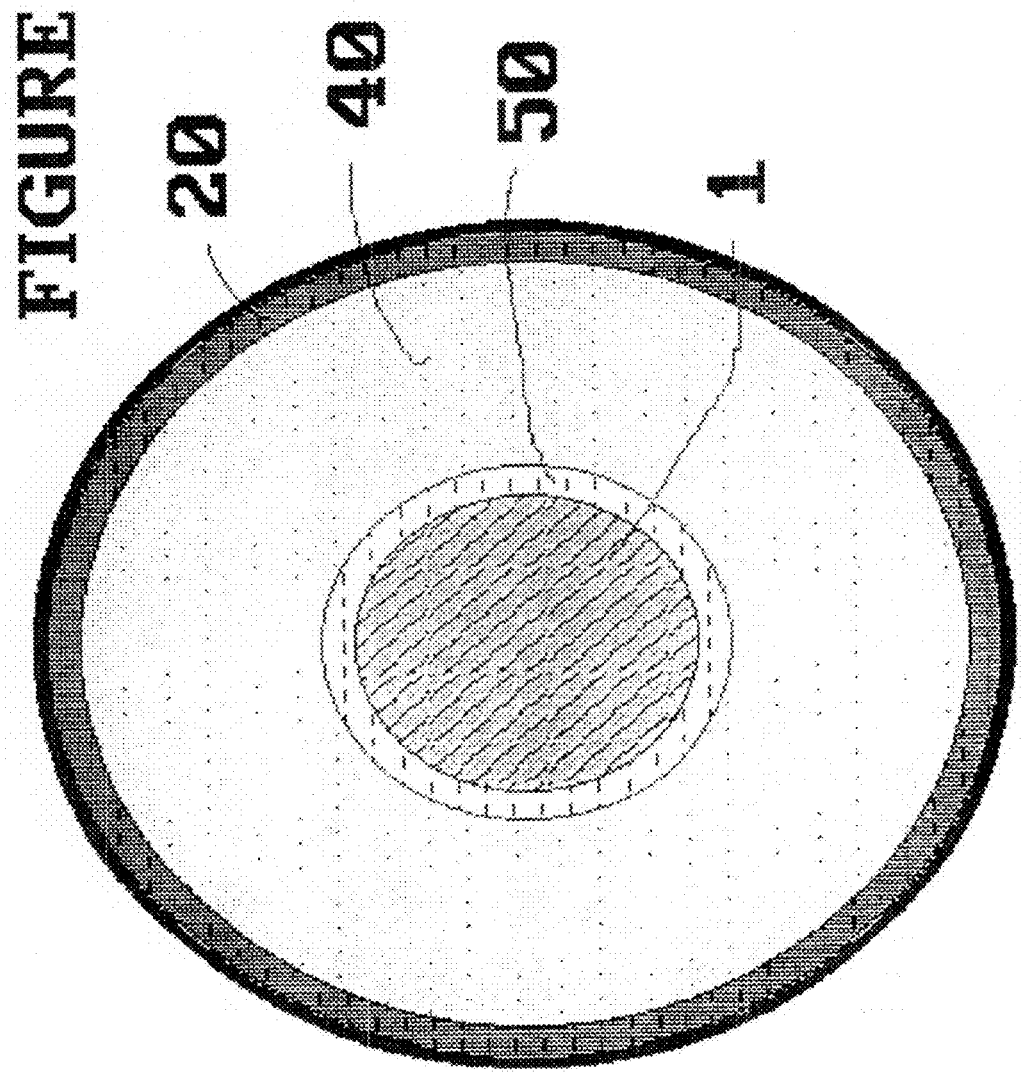

FIG. 8 shows a vertical cross-sectional slice of a device, showing structural external casing support system, a centrally placed axially-filled cathode, a coaxial deuteron-barrier and coaxial expansion-barrier.

Figure 9:
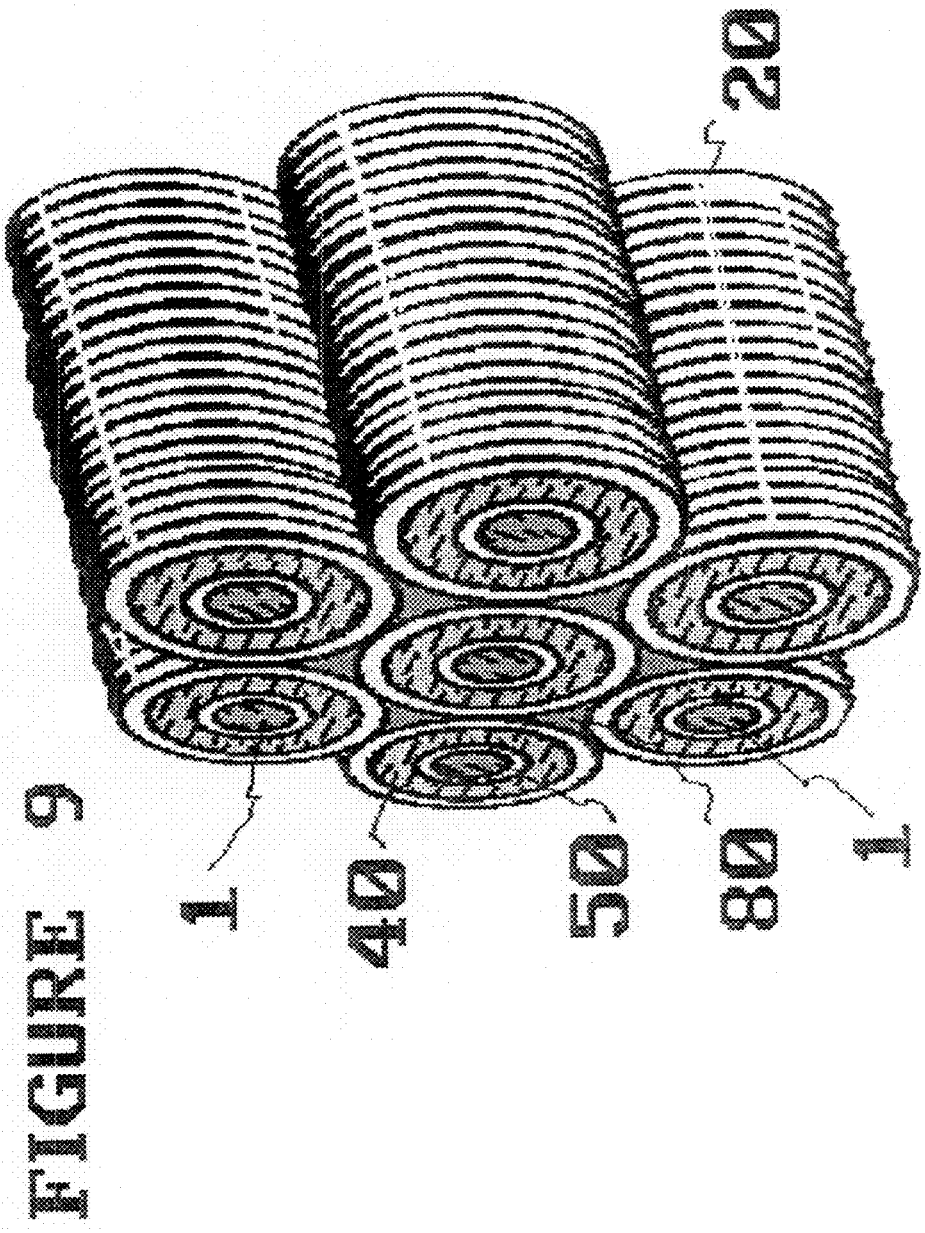

FIG. 9 is a cluster of seven devices, held together by an external structural casing support system, and an intercluster thermomechanical material filling the spaces between said devices.

Figure 10:
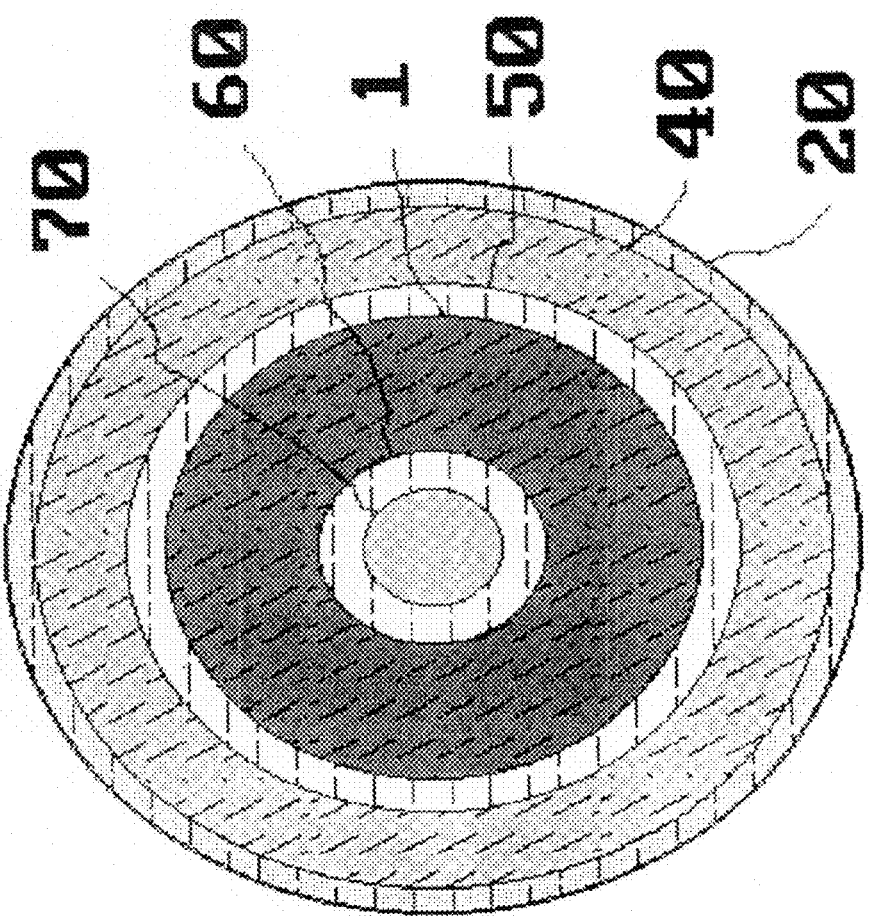

FIG. 10 shows a vertical cross-sectional slice of a device, with a central axially-filled cathode, two coaxial deuteron-barriers and an inner thermal pipe.

Figure 11:
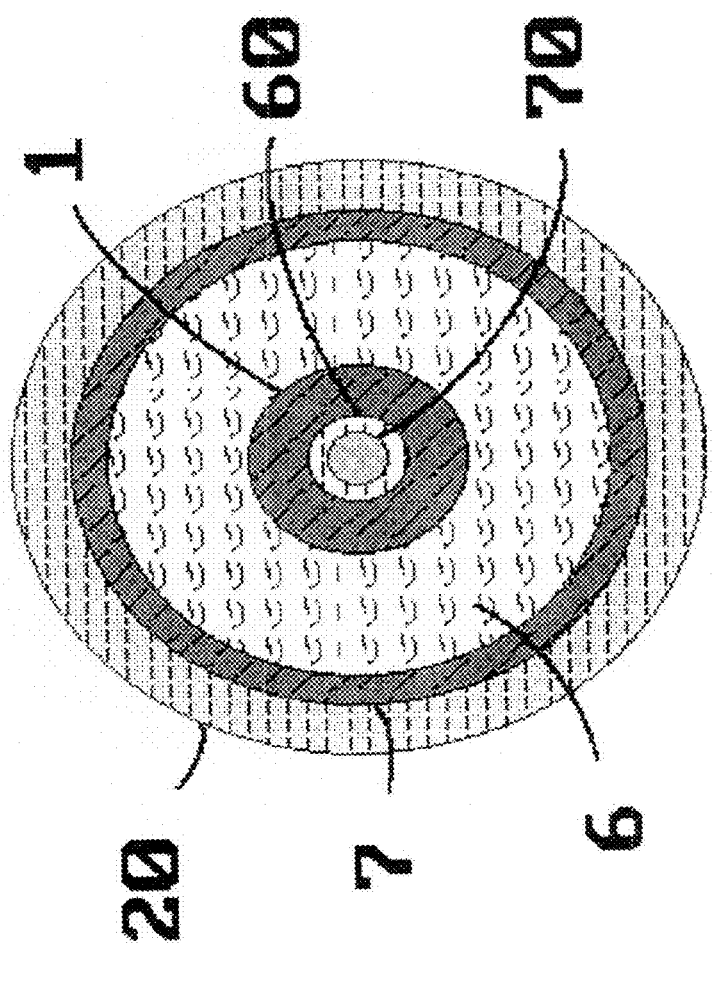

FIG. 11 shows a vertical cross-sectional slice of a device with a coaxially-filled cathode. The electric fields are in the radial direction. Also shown are an inner coaxial deuteron-barrier and thermal pipe.

Figure 12:
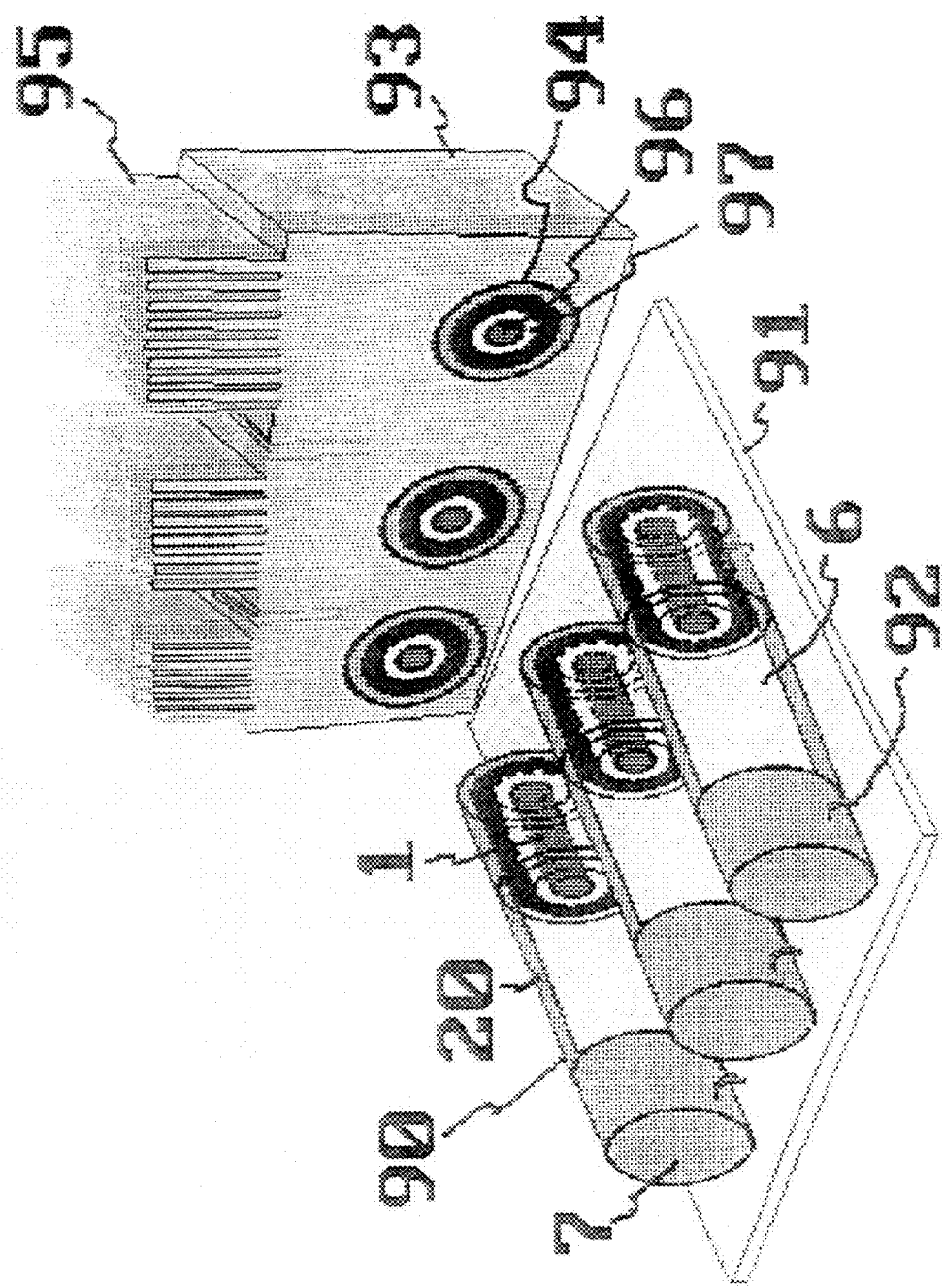

FIG. 12 shows three devices mounted to the CAM device integration board. Said board is not yet inserted into a device receptor apparatus which contains electrical arid thermal connectors held in a mechanical connecting system.

Figure 13:
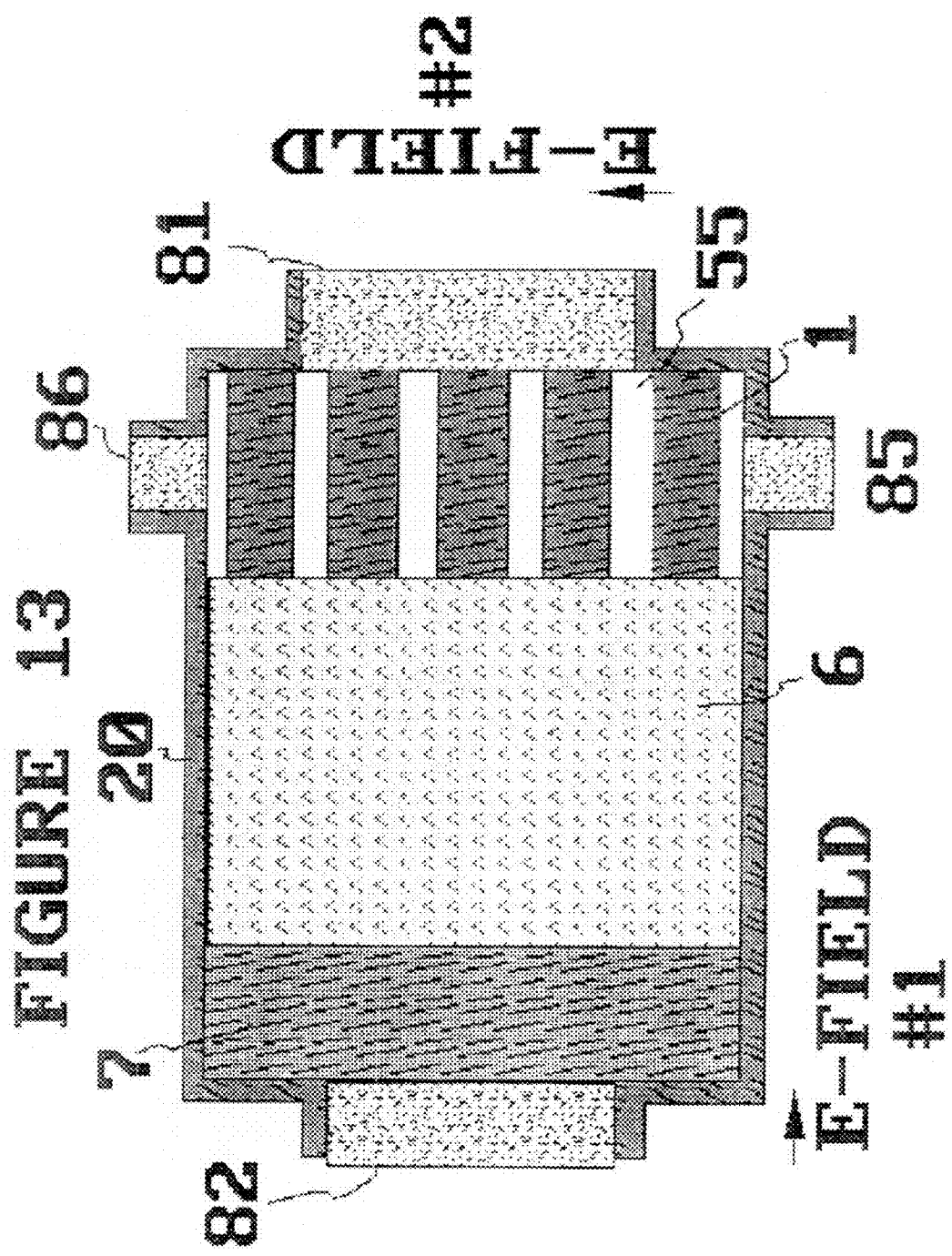

FIG. 13 is a crossectional drawing of a lamellar CAM reactor. This device has two orthogonal applied electric fields. The second applied electric field intensity is delivered after full charging. Between these slabs of the cathode alternate deuteron-impermeable barriers.

Figure 14:
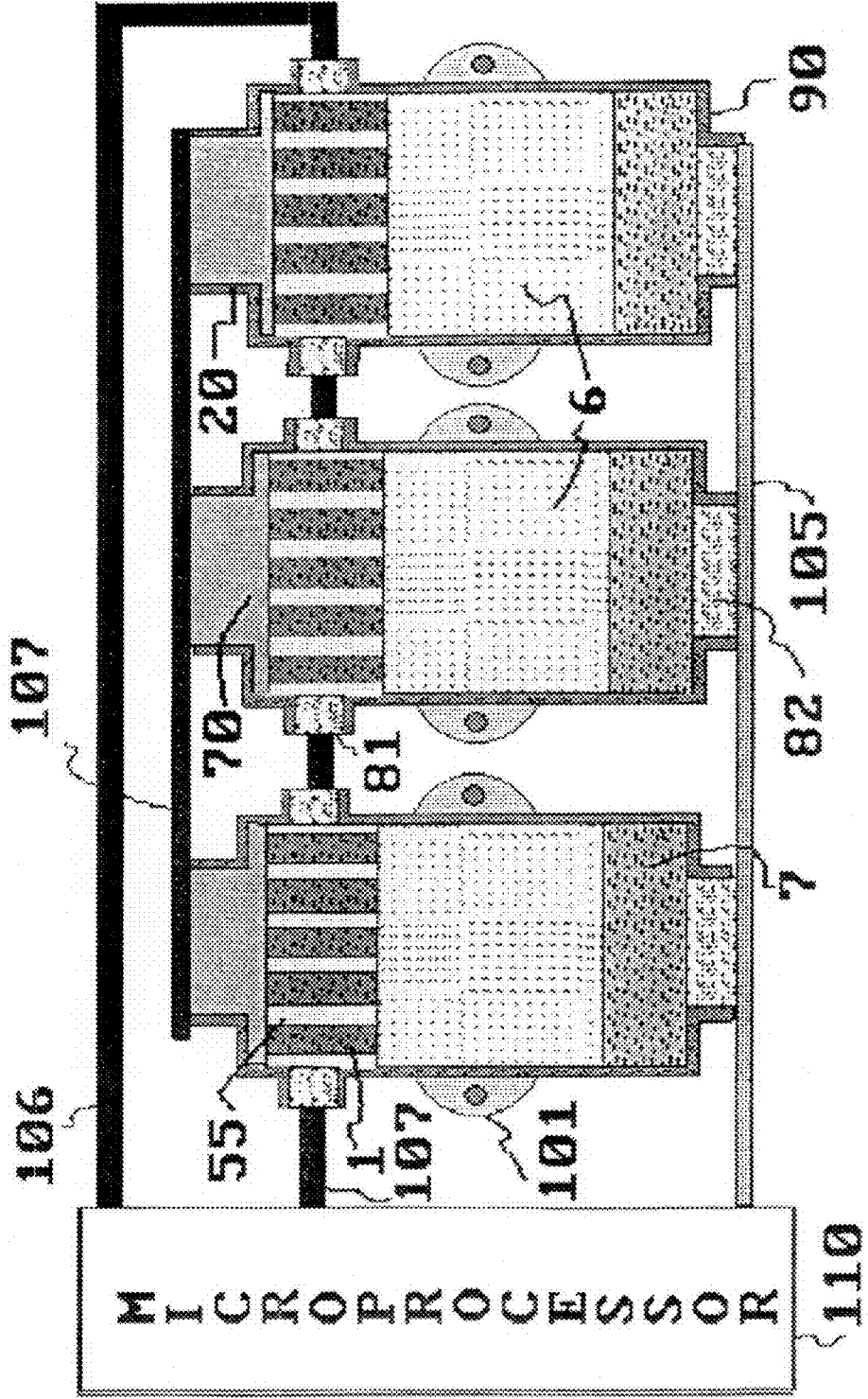

FIG. 14 shows three lamellar CAM reactors. Each device is equipped with orthogonal applied electric fields. Said apparatus has a thermal bus connected to the heat pipes which are held within a mechanical connecting system.

Figure 15:
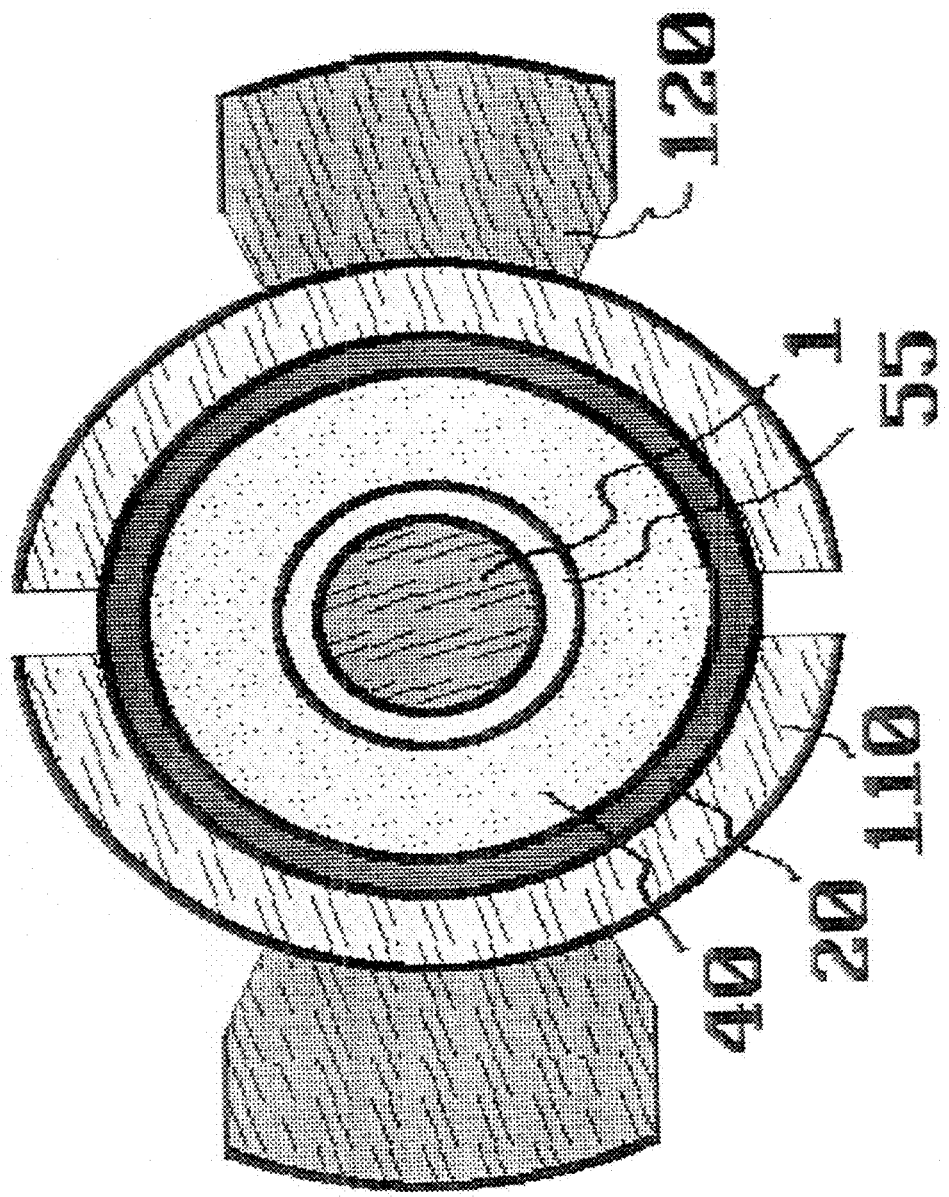

FIG. 15 is a crossectional drawing of a device used to ignite a CAM reactor. External structures are near circumferential in location, and are used to squeeze the CAM reactor.

Figure 16:
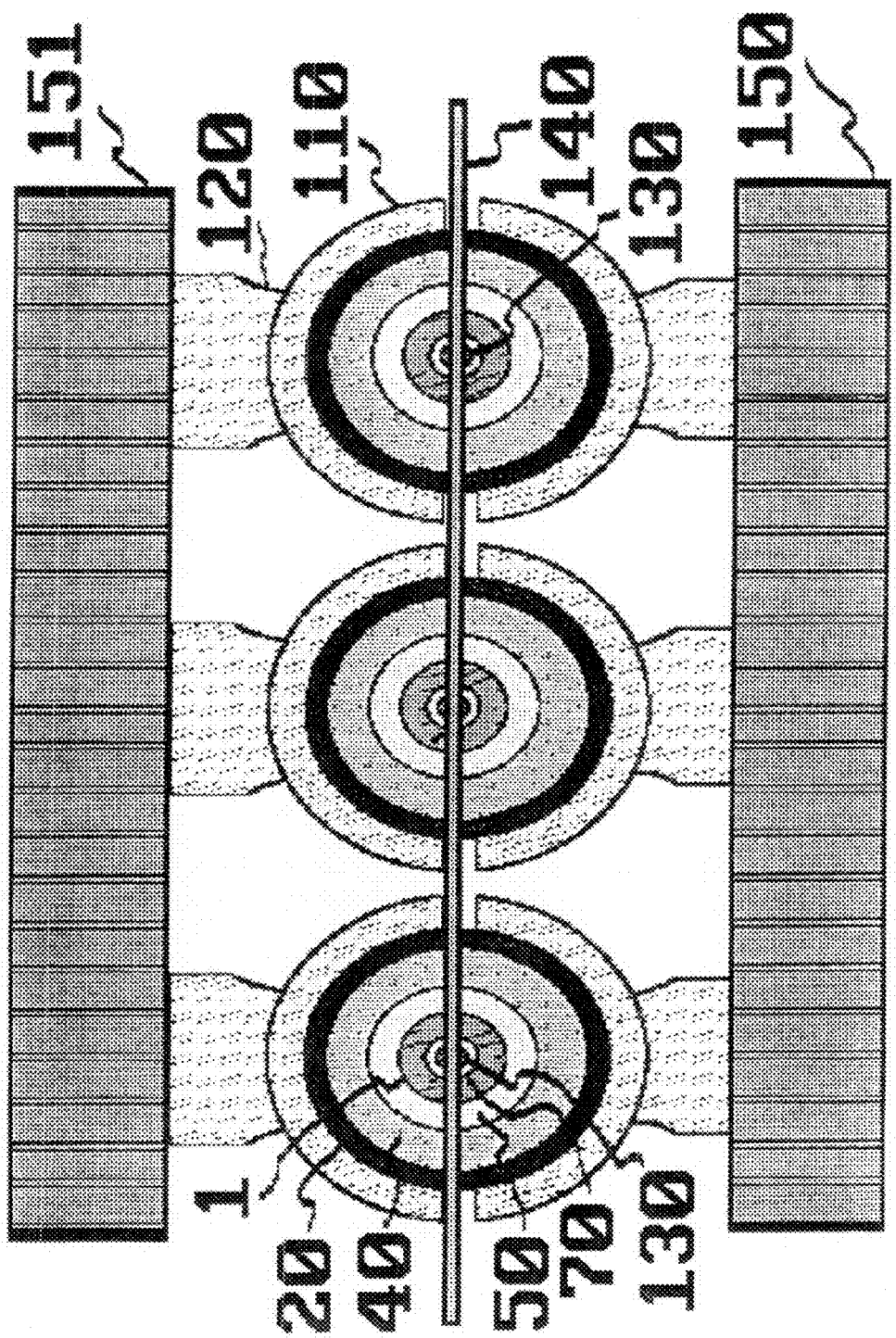

FIG. 16 is a crossectional-drawing which shows three pressure-ignited CAM reactors. Each reactor contain, heat pipes, and thermomechanical connector for assembling the heat pipes to the external thermal bus.

Figure 17:
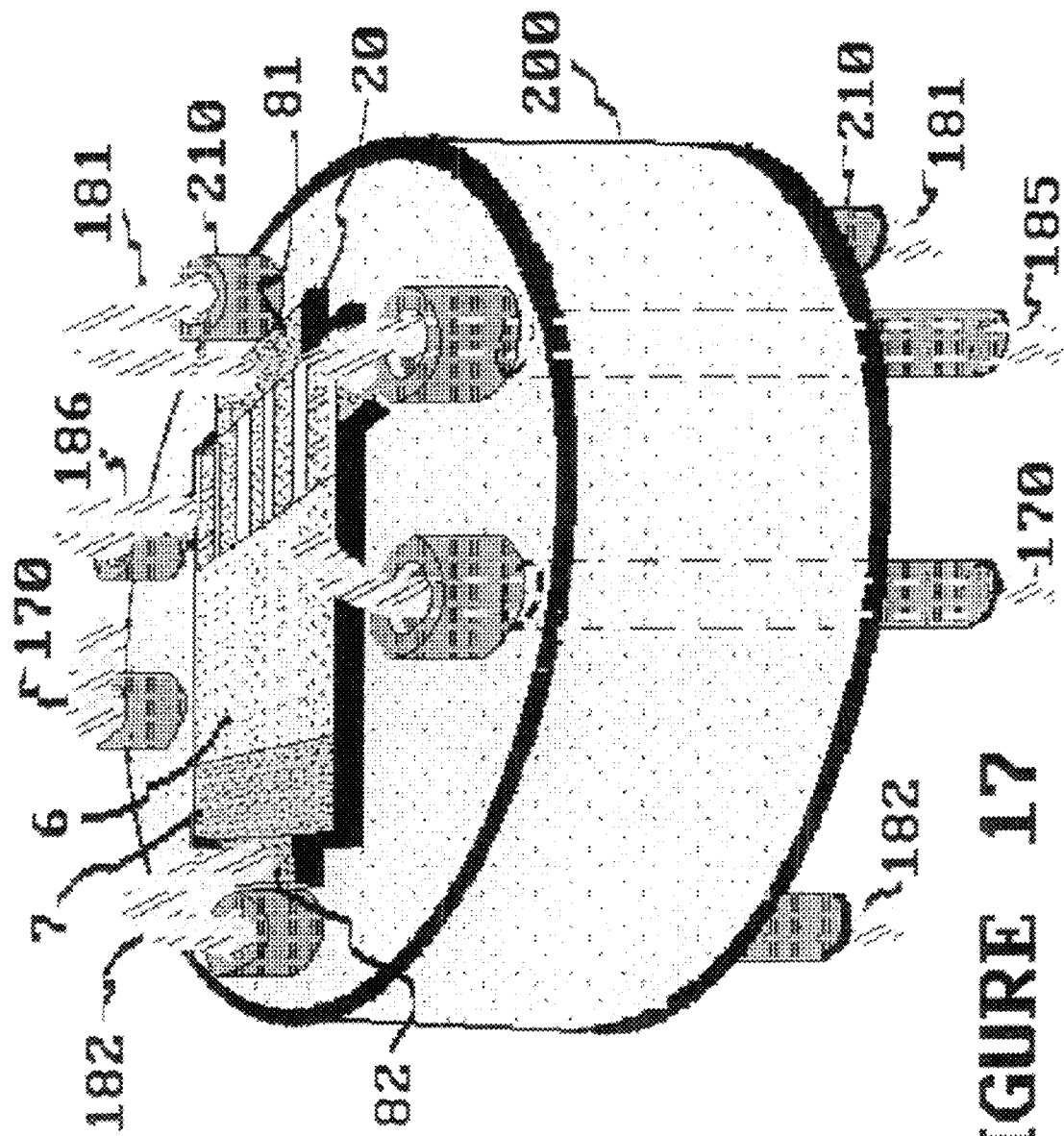

FIG. 17 is an isometric view of a thick film device located in a transistor-like header, with six leads.

Figure 18:
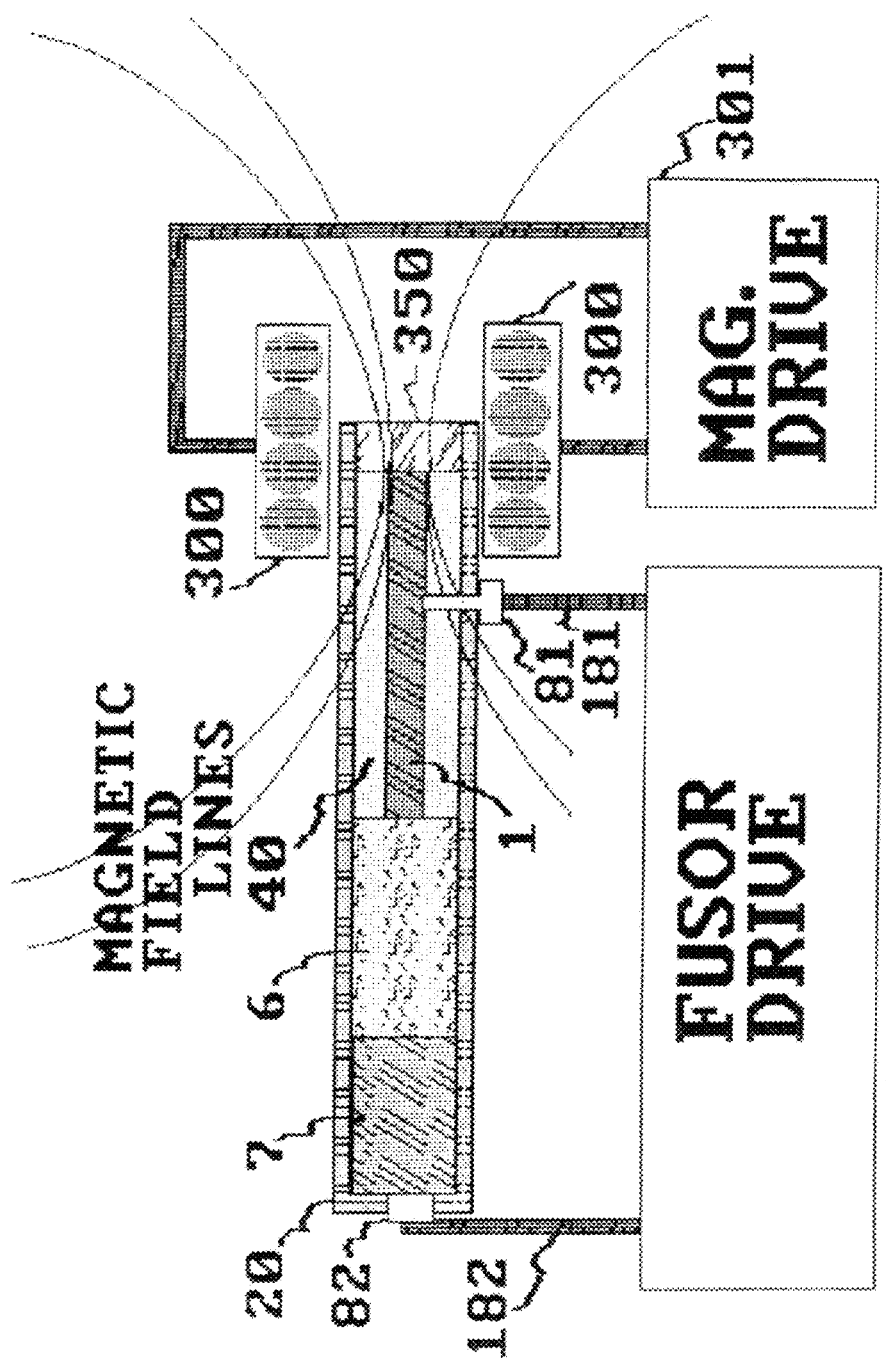

FIG. 18 is a crossectional drawing of a device to extract and isotopic product from a reactor. A magnetic field is applied.

Figure 1:
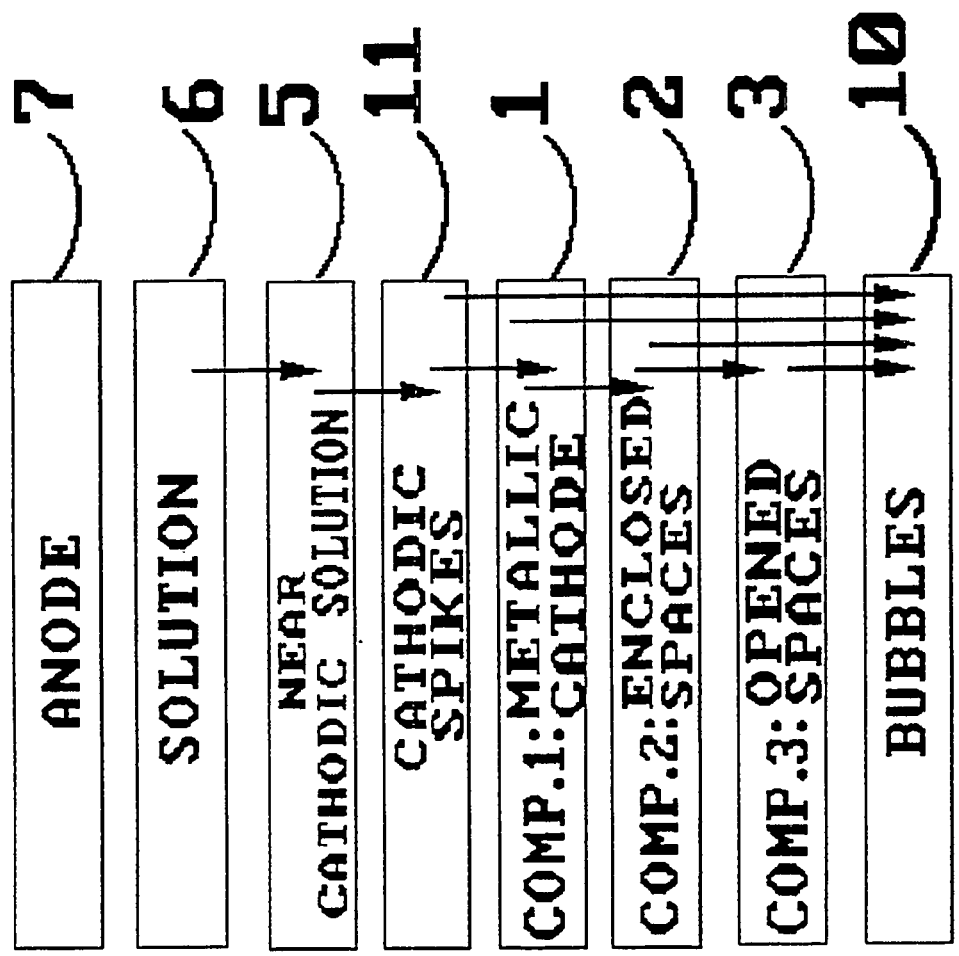

Turning now to the figures:

FIG. 1 symbolically shows the compartments used to analyze an electrochemical reactor. FIG. 1 gives organization to the different parts of a simple reactor referred to in this disclosure. It is not meant to be physically realistic with respect to size. The cathode is dissected into four regions. Three compartments are shown within the metal itself. The flow of deuterons is shown by arrows. The label 1 represents the metallic cathode, usually palladium in the preferred configuration. The labels 2 and 3 represents compartments 2, and 3 respectively, which are discussed in detail below. The label 7 represents the anode which in the preferred embodiment is composed of palladium.

The label 6 represents the solution consisting in the preferred embodiment of a gel containing antidesiccant, in combination with LiOD, palladium salts, and heavy water ($D_2O$). The power supply and control unit consists of a current source and FUSOR reactor control device as described in Swartz (1989), and are not shown in the figure. For simplicity, the electrical connections, heat removing apparatus, and several improvements described in this disclosure are not shown in FIG. 1.

The application of said power source creates an applied electric field intensity which produces cation flow towards the cathode. There results in the near cathode solution (labeled as 5 in FIG. 1) a buildup of deuterons, and a low dielectric constant (gas bubble) layer. The bubbles are labeled as number 10 in FIG. 1. There may be spikes or on the cathode (labeled as 11 in FIG. 1).

Classically, an electrode in a deuteron solution at equilibrium should measure potentials associated with the Nernst equation. However, during the reaction, the system is not at equilibrium. Thermodynamics assumes equilibrium but tells nothing of the rate. Therefore, a quasi-1-dimensional model can be used to describe the situation external to the cathode. In the absence of solution convection, molecular flux (F) results from both concentration gradients and electrophoretic drift.

$$F(D^+) = -\left[B \cdot \frac{d[D^+]}{dz}\right] - \left[\mu \cdot [D^+] \cdot \rightarrow \vec{\nabla}\Phi\right]$$

Coupled equations thus determine the distribution of deuteron species in the bulk solution. $K_f$ is the bulk rate of the desired reactions. $K_c$ is the rate at which deuterons physically enter the palladium cathode. B is the diffusivity.

$$\frac{d[D^+]}{dt} = -K_F + \left[B \cdot \frac{d[D^+]}{dz}\right] + \cdot \left[\mu \cdot [D^+] \cdot (\vec{\nabla})\Phi\right] + \mu \cdot \frac{d[\Phi]}{dz} \cdot \frac{d[D^+]}{dz}\right] - K_c$$

For simplicity, a number of approximations are made, such as no free charge density. In addition, deuteron penetration occurs at the cathode, and is electron limited, at an efficiency of Ec, so that the following steady state expression for the initial coefficient of the final spatial distribution of deuterons is:

$$D^+(z) = \frac{\left(\frac{I \cdot E_C}{A \cdot F}\right) \cdot \sqrt{\frac{K_F}{B}}}{\cosh\left(\sqrt{\frac{K_F}{B}} \cdot L\right) - 1}$$

Figure 2:
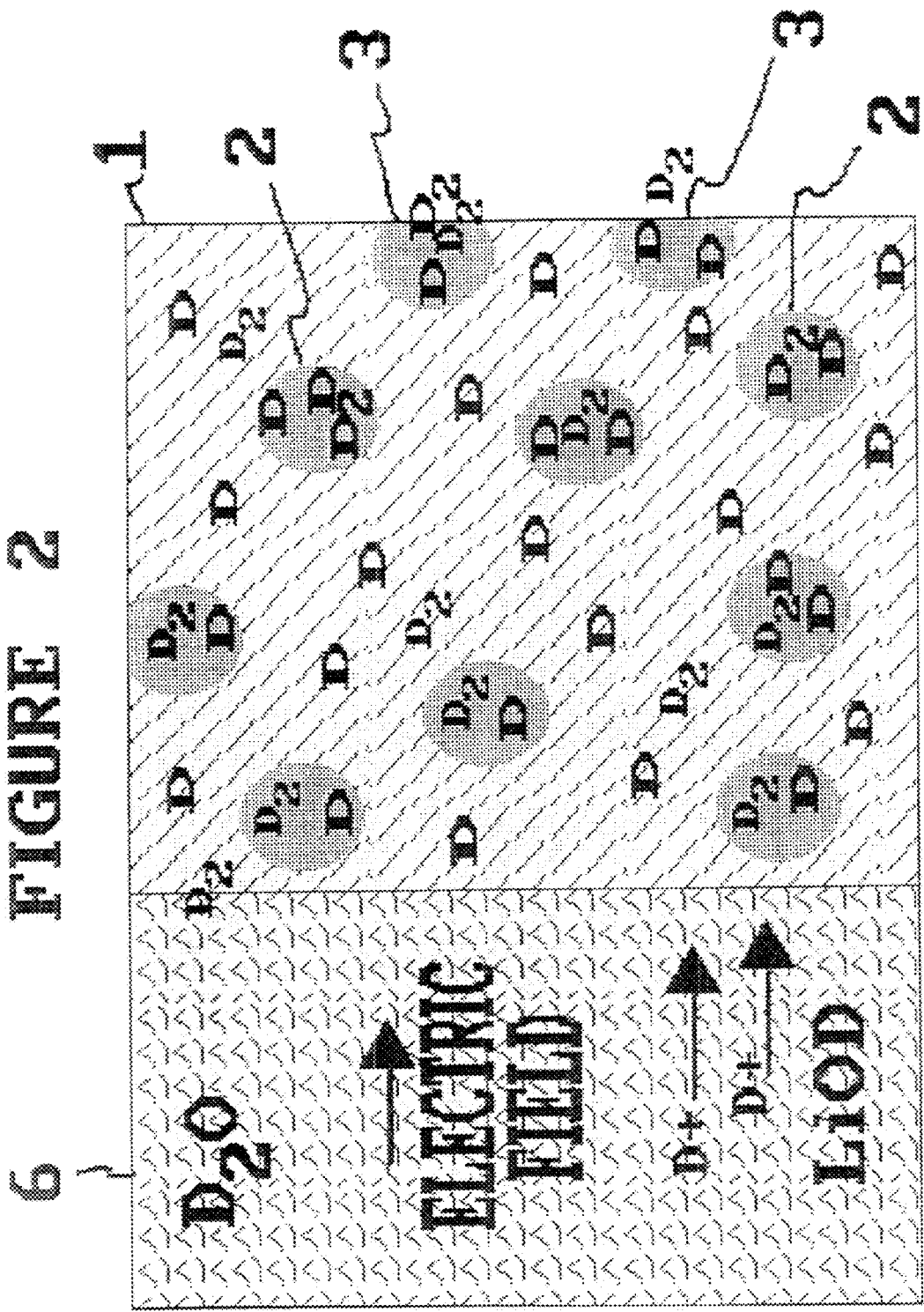
FIG. 2 is a simplified two-dimensional diagram which schematically shows the cathodic compartments used to describe an electrochemical reactor. Although the cathode is divided into four regions, only three are shown in this figure, for simplicity.

FIG. 2 a simplified two-dimensional diagram which schematically shows the cathodic compartments used to describe a CAM electrochemical reactor. The cathode is dissected into several regions. The label 1 again represents the crystalline metal cathode. In FIG. 2, the label 2 points out the entrapped volumes within compartment 1 (label 1). Three of the compartments are open to the ambient and two are labelled by number 3; they represent compartment 3. Most current theories involve the crystalline metal (label 1).

One problem with tunneling in the crystalline metal is that the internuclear separation is even larger (0.3 Angstroms) than in an isolated $D_2$ molecule. Although this may be offset by theoretical screening by localized 4d electrons, the tunneling probability remains vanishingly small until internuclear distances of less than 0.7 Angstroms occur.

Therefore, to explain the invoked tunneling, current theories suggest either screening effects of electrons, high effective mass electrons, decreased effective deuteron mass, deuteron energy fluctuations, or coherent screening. The rest of theories use the periodic lattice to surmount the obstacle. Other models involve shrunken atoms either by a theory or by the proven interaction of heavy negative particle with the crystalline metal lattice containing deuterons. The muon capture theory begins with heavy muon capture by a deuteron leading to a greatly contracted "electronic" shell around the deuterium nucleus by a factor of 200.

The catastrophic active medium (CAM) theory differs from the other theories in that the desired reactions are hypothesized to not occur within the metal bulk, but at certain large vacancies and defects by the sudden fractional desaturation of deuterons. The CAM Model approximates the palladium (or titanium) used by three compartments. FIG. 2 schematically shows a piece of such highly loaded metal. The bulk metal crystalline lattice comprising the cathode is compartment 1. Large defects consisting of enclosed spaces—not open to the ambient—compromise compartment 2. With subsequent crack, fissure, or other dislocation compartment 3 is formed. The model for the cathode consists of three compartments (FIG. 1).

One cathodic compartment consists of the crystalline (e.g., beta phase) palladium into which deuterons can diffuse and remain in well-defined shallow energy traps. The second and third compartments of the cathode consist of the defects, grain boundary dislocations, and larger defects merging into bubbles and fissures. It is the multiple compartments of the cathode which makes the CAM theory unique. The desired reactions are postulated to occur outside of the crystalline palladium lattice (compartment 1). It is the movement of deuterons to compartment 2 which begins the process at that location. Catastrophic deuteron flux, coupled with a exothermic deuteron desaturation of the active medium, drives the fusion reactions.

This occurs until, by a second catastrophic process, the fusion-defect-site is no longer confined. The final reactions in the CAM theory ends with the opening up of the defect or fissure through a large crack (compartment 3). By this theory the fissures are the result of the catastrophic desaturation of the active medium that was previously fully deuterated (e.g. in the preferred embodiment palladium or titanium).

The CAM theory may offer explanations for the tremendous "difficulties" observed by many experimenters attempting to repeat experiments, for the bursts of excess energy seen, for the very tardive appearances of both the excess energy and those bursts. The CAM theory begins at the cathode, labeled 1, by taking into account the special character of palladium and titanium with respect to deuterons and hydrogen.

In most metals (e.g. aluminum, cobalt, copper, iron, nickel, platinum, silver, and tin) the deuterium solubility is described by the experimental relation [where K is the Sievert constant, and p is the partial pressure of deuterium gas ($S=K*\sqrt{p}$)]. However, all such metals have low solubility, and only dilute solutions are stable (about one deuterons per 10,000 or more metal atoms). Furthermore, in such metals deuteron solubility is endothermic. Therefore, the solubility for these metals increases with temperature.

In contrast within palladium and titanium (and other Group IVb and Vb metals and some rare earths such as cerium, lanthanum, niobium, tantalum, thorium, vanadium, zirconium) much different behavior occurs. First, much more concentrated solutions can exist. For these metals the greater deuteron concentrations mean that they act like emphores ('vases', similar to the biomaterial myoglobin). Furthermore, the deuteron binding in these metals is exothermic. This indicates that the deuterons reside in shallow energy traps located within and throughout the lattice. Most importantly for the CAM theory, the deuteron binding capacities decrease with temperature for these metals.

The deuteron-laden metal lattices change significantly with increasing deuteron loading. An extensive literature, involving solubility isotherms and x-ray results demonstrates two solid solutions of protons in palladium. During the time of deuteron loading there is progressive increase in the volume of the cathode. A 5000 atmosphere internal pressure is consistent with the 4% plastic deformation following deuterium loading.

Classically, the atomic ratio of deuterons to palladium is used to describe the quantity of deuterons in metal.

(Pd D$_x$), where $$x = \frac{[numberD]}{[numberPd]}$$

This is broken up in the CAM model. The total deuteron content in a given volume of palladium cathode is modeled as the sum of the deuterons physically located in compartments 2 and 3 (and in any amorphous palladium hereinafter ignored for simplification) and those deuterons which are entrapped within the palladium lattice (compartment 1). The quantity of the former amount is modeled as the product of the Henry gas solubility coefficient and the deuterium partial pressure [$P_{D_2}$].

The quantity of the latter depends both upon the amount of deuteron binding material present [e.g. palladium in its beta phase], the number of intralattice sites available for the deuterons (n) and the affinity of the palladium lattice for those deuterons.

The affinity is thus modeled as a fractional saturation ($y_D$).

$$P_{D_2} = [a \cdot (P_{D_2}) \cdot f] + [(1-f) \cdot y_D \cdot \hat{n}]$$

f is the fractional amount of defect sites (e.g. compartments 2 and 3) in the beta-phase palladium. For a solid metal cathode, the quantity of dissolved deuterons in compartments 2 and 3 (first term above) is small compared to that bound to palladium because most of the metal resides in a crystalline lattice. Thus, f is therefore close to zero.

This relation can be examined in the limit of f approaching zero by l'Hospital's Rule. That analysis indicates that the deuteron pressure is related to the quantity of bound deuterons as:

$$\text{Lim } P_{D2}(f=>0) = n^* y_D/\alpha$$

This indicates that CAM model in that limit is consistent with well-known solubility laws of deuterons in most materials.

Figure 3:
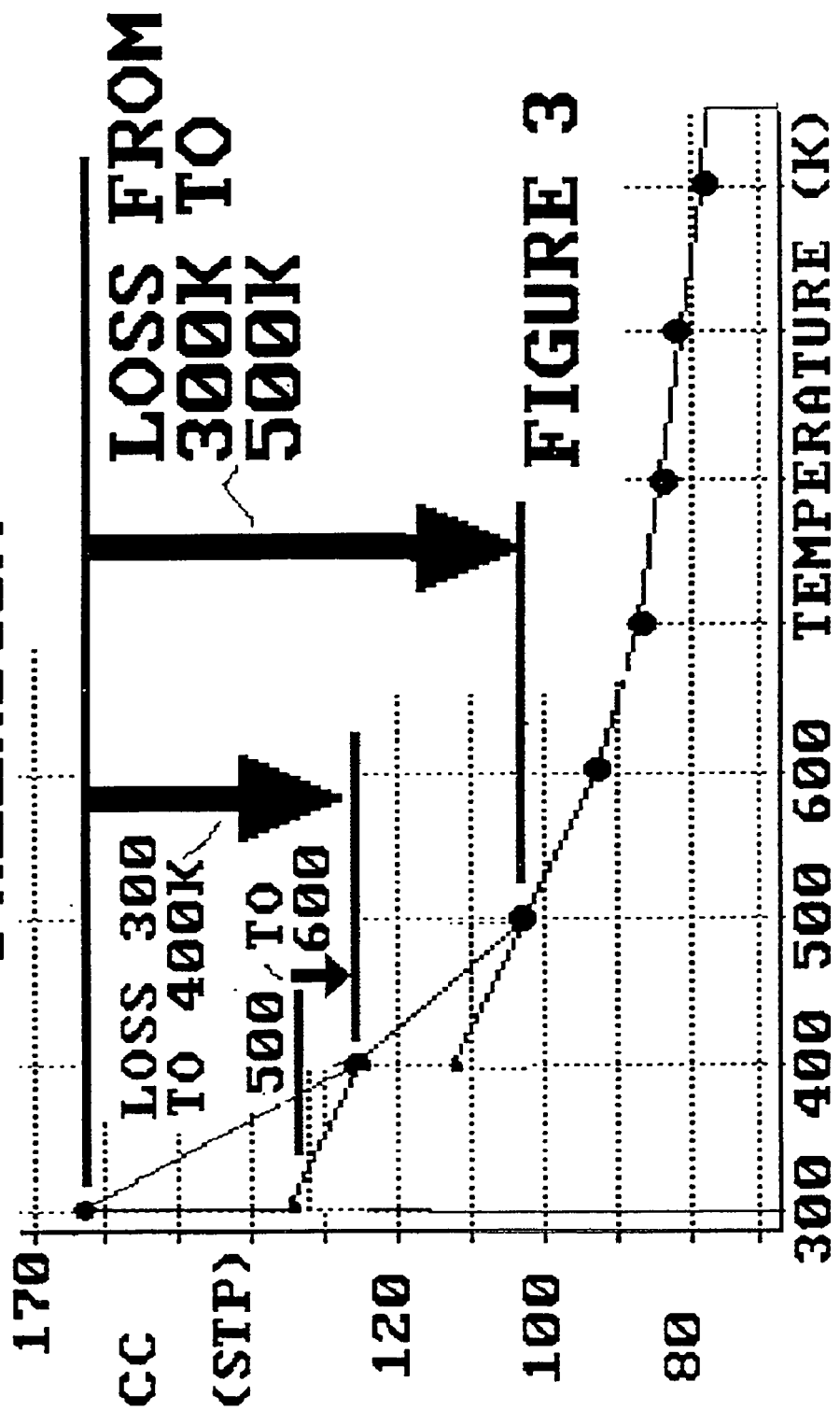
FIG. 3 shows the change in hydrogen binding for palladium, along with Taylor series expansion at two temperatures.

FIG. 3 shows the hydrogen-solubility (hereinafter called saturation or binding) for palladium as a function of temperature, along with Taylor series expansions at two temperatures. The curve shows the quantity in cubic centimeters (STP) contained in 100 grams of palladium. The total quantity of hydrogen in palladium is markedly temperature dependent. The Taylor series expansion shows that the differential desaturation with temperature increases with decreasing temperature. The sharp decrease in total quantity bound for an increase in temperature may drive the desired reactions by catastrophically displacing deuterons into compartment 2.

Many of the technologies now described are useful no matter how filling of the deuterated metal occurs. Some preliminary comments are in order. Because the process and apparatus are independent of method of filling said metal, a greater examination is now given to said deuterated metal. The actual loading of the palladium will be ignored for the CAM model and theory, but said deuteron loading does play a significant part of the device described below.

The CAM theory considers palladium as an "active" medium because unlike most other metals, palladium has a deuteron capacity which falls rapidly as the temperature rises. The temperature effect upon deuteron desaturation, in palladium, usually begins in the beta phase. The binding decreases so markedly with temperature that there is almost a decade decrease from just 0 to 50 Centigrade. At 110 C, the beta phase converts to the alpha phase with an additional 0.3 moles of 0$_2$ gas released.

In the CAM model there is assumed to be rapid mass transfer from compartment 1 to 2 as the catastrophic desaturation occurs. This is a reasonable assumption because of the deuteron diffusivity in palladium increases with temperature. It is that increase in diffusivity which enables palladium foils to remove hydrogen and deuterium from other gases at elevated temperature. The CAM hypothesis was tested in a computer simulation wherein the desired reactions were hypothesized to occur only in the metal-surrounded free gas compartment located physically within the cathode (FIG. 1). The fractional saturation was approximated by expressions for both pressure and temperature qualitatively similar to those reported.

$$y_D = 1 - \exp\left[\frac{-P_{D_2}}{c_1 \cdot T}\right]$$

The last qualitative assumption used was that the temperature would increase very slightly with the desired events, secondary to markedly increased pressures for deuteron pressures greater than 50 atmospheres.

The qualitative model used to test the catastrophic active medium (CAM) theory did show that in the model the metal was capable of exothermic catastrophic fractional desaturation. FIG. 6 shows the results of that simulation. The same phenomenon occurred for several different such qualitative formulations. The three curves are A) the normalized deuteron pressure (in atmospheres), B) the normalized system temperature, C) the fractional saturation ($y_D$) of the active medium (palladium).

Figure 4:
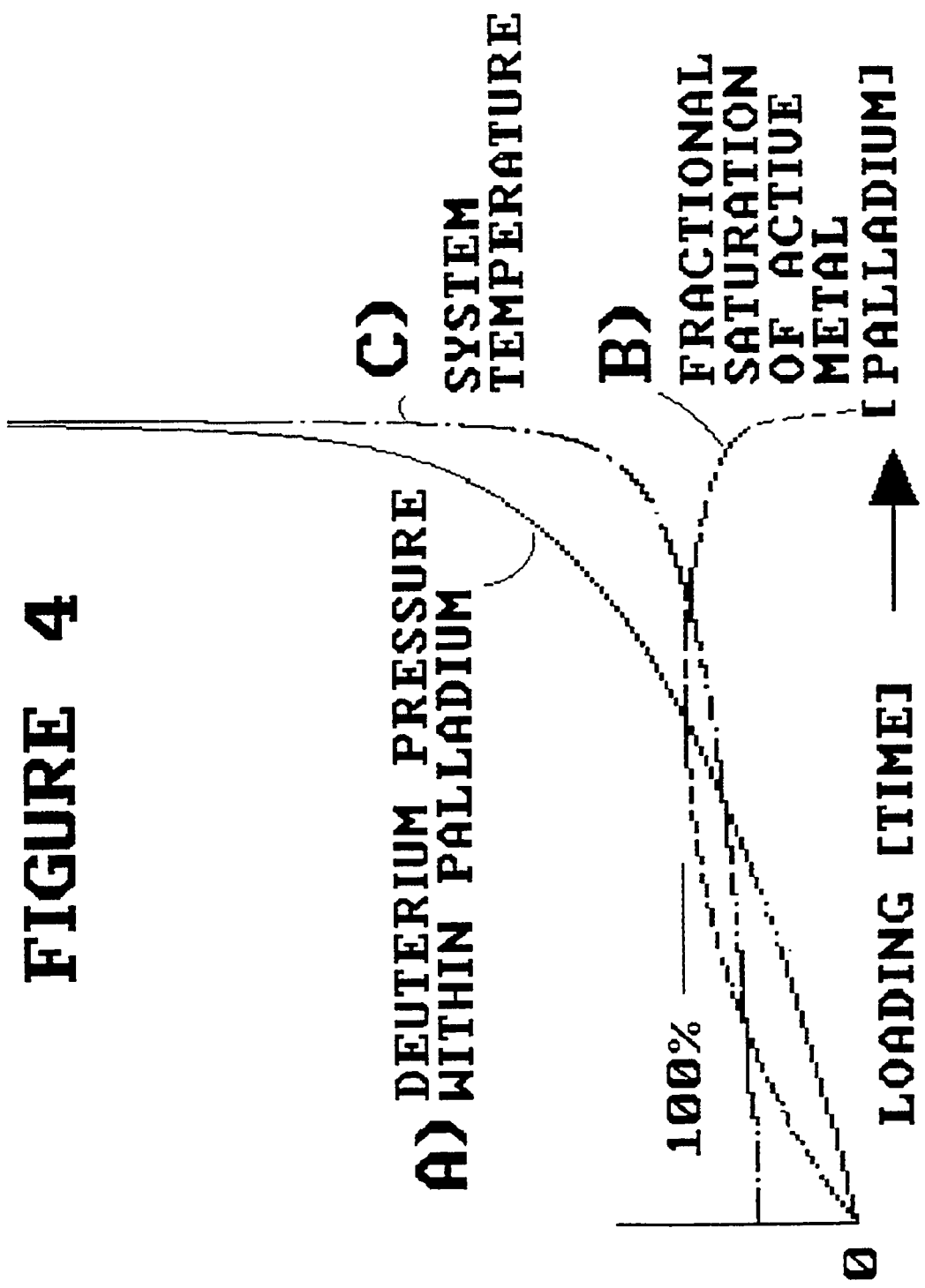
FIG. 4 shows the output of a simulation of a qualitative model used to test the catastrophic active medium (CAM) theory.

FIG. 4 shows that as current is delivered to the cathode there is a steady increase in deuterium within the cathode. Initially, because of the large capacity for deuteron binding in compartment 1, the deuteron pressure rises only slightly. Thus the sublinear relation of total deuteron content to pressure, shown by the CAM model may also be consistent with the $\sqrt{p}$ law, experimentally derived, and discussed above. FIG. 4 shows that the computer model predicted that compartment 2 is suddenly, catastrophically, fed deuterons from the larger crystalline palladium lattice compartment. It can be seen that there occurs a critical catastrophic event wherein the fractional saturation suddenly falls as the temperature rises in concert.

As the active medium (palladium) catastrophically releases deuterons to the defect sites astronomic pressures develop. In a crescendo fashion, the desired reactions result and the cathodic temperature rises even further. The temperature in compartment 2 rises further, but is limited as phonons carry off the excess energy of the reactions. The active medium around the defect site, in which the desired reactions occur, reabsorbs phonons resulting in the observed excess heat.

The catastrophe occurs precisely because the further temperature increase causes even more flux of deuterons into compartment 2, further increasing the likelihood of the desired reactions. The reaction is driven by the catastrophic fractional desaturation of deuterons from the crystalline palladium lattice, previously filled to capacity. The catastrophic mass transfer of deuterons to the defects (from the saturated metal, not the solution) enables the desired reactions to occur. Also the electrical charging of the cathode to a high negative voltage should enhance the reaction.

The reactions of deuterium continue until the crystalline palladium (the active medium because of its high fractional saturation and its exothermic desaturation tendency) is spent of its deuterons or until, by a second catastrophic process, the fusion-defect-site is no longer confined. At that point, catastrophic exposure of compartment 2 to the ambient occurs creating compartment 3. The intracathodic compartment 3 of the CAM theory is known from endstage deuteron (or hydrogen) embrittlement. This compartment usually declares itself when the dissolved deuterons, after entering a metal through a corrosion reaction or by cathodic polarization, explode into the ambient as the metal fissures or otherwise irrefutably changes shape. The fugacities involved are enormous ranging from 5000 up to an estimated 107 atmospheres for hydrogenated palladium.

One special compartment 2 should be noted. Because the solubility of deuterium in water is relatively low, the electrolyte solution itself acts as a barrier to create another type of compartment 2 which is more compliant because of the water (hydrogen bonds vs. covalent bonds of the palladium). The space charge formation, the low dielectric layers (gases) in front of the cathode, any spikes on the cathode, work together at this compartment 2 to create very large electric field intensities. Further ionization reactions contribute to activate the reaction.

Figure 5:
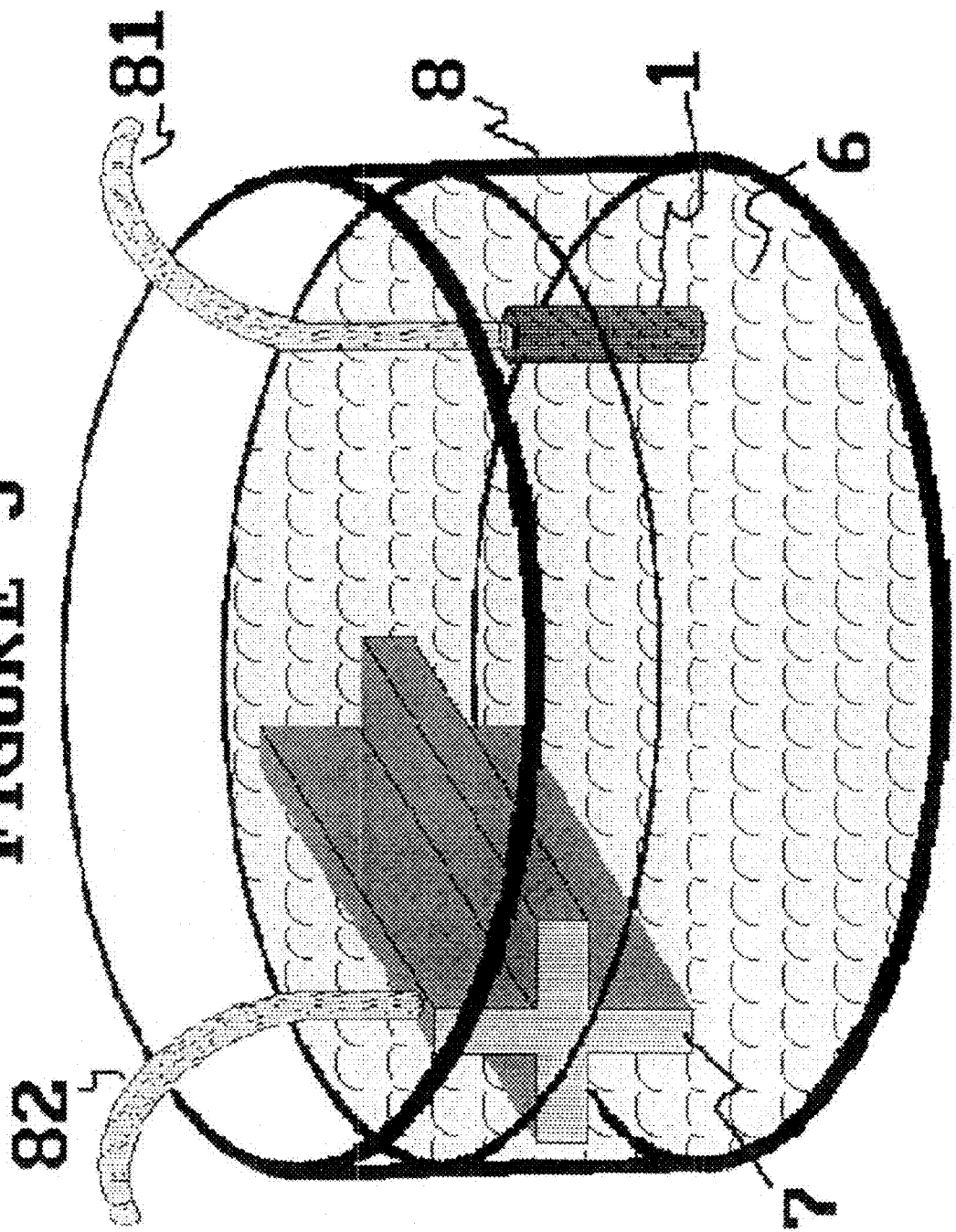
FIG. 5 shows a typical experimental setup with a cruciform sacrificial cathode of palladium.

Turning now to FIG. 5 shows a typical experimental setup, but with a novel cruciform-shaped sacrificial anode of palladium in a solution (labeled 7). The preferred solution (6) contains palladium salts, lithium deuteroxide, and heavy water. The cruciform shape is the preferred shape of the anode in that as it is sacrificed to the solution (enabling efficient codeposition of palladium and deuterons) the surface area most nearly remains constant during its decomposition of said sacrificial anode. The connections to the electrodes are labeled as 81 and 82. The reaction vessel is labeled 8. The cathode is labeled as number 1.

This type of system, coupled with the FUSOR (JET ENERY, INC., MA) drive system, is capable of filling the cathode with deuterium from the solution. However, the deuterated metals could also be filled by codeposition of deuterium and palladium, or by high pressure deuterium gas.

In the following devices, heat pipes are included as well as a superassembly capable of removing excess heat.

In the following devices, palladium is the described preferred embodiment for the cathodes, but members of the group consisting of vanadium tantalum, niobium, lanthanum and cerium may also be used.

Furthermore, one improvement is that the cathode should be improved for deuteron solubility, while being stabilized from catastrophic deformation which would end the desired reactions. There are a number of methods by which this is accomplished.

Within the metal (labeled 1), there are several methods used in this device to minimizing catastrophic fracture. First, is the preferred use of cathodic binary alloys. Some palladium alloys (e.g. boron, silver or gold) exhibit, for intermediate compositions, peak levels of hydrogen (and deuteron) solubility.

Second, in the preferred embodiment manganese could be added to the palladium to decrease the susceptibility to deuteron cracking. Third, in the preferred embodiment said cathode is stabilized by an external barrier construction. Fourth in the preferred embodiment additional diffusion barriers are placed to obstruct the released deuterons.

In the preferred embodiment internal materials are added to decrease the likelihood of electrode deformation. For example a composite material could be fashioned using palladium and epoxy so that the electrode is more like bubblegum than like crystalline metal. Although the inter- and intramolecular forces are less, the bond energies increase because the important parameter is the product of force times distance. The weaker interactions, acting over longer distances, would lead to increased energies required to rupture the electrode.

In the preferred embodiment tungsten microspheres are added to the metal. The very large melting temperature of the tungsten prevents it from melting and alloying with the palladium when the desired reactions are achieved. The purpose of the spherical shape of the microspheres is to stop the propagation of defects by giving a large radius of curvature which thus decreases the likelihood of said defects proceeding.

FIG. 6 a simplified two-dimensional diagram which schematically shows the effect of providing intracathodic materials to quench mechanical crack propagation and subsequent breakdown of said cathode. The crystalline metal cathode is labeled 1. The deuterons and D2 gas located therein are not labeled. Compartment 2 is labeled, and a compartment 3 (compartment 2 opening to the ambient) in the upper right corner is not labeled.

Spheres, or rods, labeled 30 in FIG. 6, are present within the cathode to act as defect terminators which stop propagating defects. Their radius of curvature is such that the force applied to the metal lattice is minimized.

After turning to FIG. 6, attention is drawn to the barrier labeled 40 which surrounds one sphere of compartment 2 (which is not labeled). It is made of a material characterized by a high modulus of elasticity so as to retard any expansion of compartment 2. The purpose of the expansion barrier is to prevent expansion of the cathode (labeled 1) and thereby minimize formation, and propagation of compartments 3.

FIG. 7 is an isometric drawing of a CAM electrochemical device, and shows the direction of the electric field. FIG. 7 shows a see-through view over the cathodic volume. This cutaway exposes the four concentric components of the device at that location. In this simplified CAM device, surrounding the cathode, in coaxial fashion, are a deuteron diffusion barrier (labeled 50) and an expansion barrier (labeled 40). These barriers are discussed in detail below. In this particular device, the cathode is axially-fed the deuterons. For simplicity, the power supply, control apparatus (including phonon drive, magnetic fields, thermal capture system and electrical connections) are not shown in FIG. 7.

The electric field points from anode (labeled as 7) to the cathode (labeled as 1). In the device shown in FIG. 3, label 20 represents the structural casing wall which makes this CAM device "dry". The enclosed solution, in the preferred embodiment actually consisting of a heavy water-LiOD-gel, and is labeled number 6. The device is shaped like a fuse and can be easily placed into, or removed from, an assembly and system used to both power the reaction and extract the excess heat. For simplicity, the power source, connections, and thermal extraction system are not shown.

FIG. 8 shows a vertical cross-sectional slice of a CAM device, having a external structural casing support system, a centrally placed axially-filled cathode, a coaxial deuteron-barrier and coaxial expansion-barrier. The structural support system (labeled 20) encloses an axially-filled cathode for loading reactions consisting of a coaxial deuteron-barrier and coaxial expansion-barrier. The expansion barrier (labeled 40) surrounds the cathode and prevents expansion. Between the two is a deuteron impermeable barrier (labeled 50) which prevents outward diffusion of deuterons when the cathode is catastrophically desaturated of its deuterons. The barrier prevents loss of deuterons to the expansion barrier, and acts as a circumferential locus of fusion. The cathode is labeled as 1. In this CAM device, the cathode is charged in a direction perpendicular to the drawing (e.g. similar to FIG. 7). For simplicity, the power supply, FUSOR™ control apparatus including phonon drive, magnetic fields, thermal capture system and electrical connections are not shown in FIG. 8.

FIG. 9 is a cluster of seven CAM devices held together by an external structural casing support system, and an intercluster thermomechanical material. A high thermally conductive epoxy would be the preferred embodiment. This would enable facile, relatively inexpensive, support and thermal coupling for the system.

The cathodes are fashioned as cylindrical palladium surrounded by a deuteron impermeable (or relatively impermeable) barrier (e.g. tungsten or gold). The result would be that after a slow charge with deuterons, the catastrophic desaturation yields a rapid symmetric flux through the walls of the cathode cylinders-directly into the impermeable wall thereby increasing fusion. For simplicity, the power supply, FUSOR control apparatus including phonon drive, magnetic fields, thermal capture system and electrical connections are not shown in FIG. 9.

FIG. 10 shows a vertical cross-sectional slice of a CAM device, with a central axially-filled cathode, two coaxial deuteron-barriers and an inner thermal pipe. This device is surrounded by a structural support system labeled 20. The axially-filled cathode (labeled 1) is constructed within and around novel devices. Coaxial with the cathode are two sites consisting of double coaxial deuteron-barriers and an inner thermal pipe.

The inner thermal barrier is labeled 70. In the preferred embodiment this would be gold. Within that barrier is the thermal pipe (labeled 70). In the preferred embodiment, the pipe could consist of a thermocouple, or be connected to a thermocouple by a diamond filament or thermally conductive composite material. The outer deuteron barrier is labeled 50. The barrier to expansion is labeled 20. For this device the inner four layers (from inner to outer) are diamond filament, gold, palladium, and gold.

FIG. 11 shows a vertical cross-sectional slice through a novel CAM coaxial device with a coaxially-filled cathode, and an inner coaxial deuteron-barrier and thermal pipe. This embodiment is in a cylindrical configuration. The electric fields are in the radial direction. This device is characterized by coaxial loading of the cathode with deuterons (labeled 1).

In the figure, the anode is circumferential to the cathode, and is labeled as 7. The solution (labeled 6) consists of lithium deuteroxide, palladium deuteroxide, and heavy water as the preferred embodiment. The inner diffusion barrier (labeled 60, and consisting of gold in the preferred embodiment) and the inner thermal pipe (labeled 70, and consisting of a diamond filament in the preferred embodiment) are shown in cross-section. For simplicity, the power supply, FUSOR control apparatus including phonon drive, magnetic fields, thermal capture system and electrical connections are not shown in FIG. 11.

Also, the intracathodic defect-terminators and the fenestrated extra-cathodic expansion barriers are not shown. The heat energy is extracted from the center. In this CAM device, the activation current is supplied between 1 and 7. The barrier (70) acts to provide a geometric focus at which the desired reactions occur. The is extracted through thermal pipe (70) which in the preferred embodiment is diamond, or composites of diamond (e.g. thermally conductive epoxy filled with diamonds).

FIG. 12 shows three CAM devices (labeled as 90 in FIG. 12; but similar to what is shown in FIG. 3). These devices each contain a cathode (labeled 1), intradevice gel containing lithium and palladium deuteroxide (labeled 6), and anode (labeled 7). These CAM devices are inserted, similar to a fuse onto a holding board (labeled 91), held in place by clips (labeled 92). Some of the clips are electrically conductive (e.g. to hold the anode) whereas other clips are insulators.

After being mounted to the board, the three CAM devices are inserted into the device receptor apparatus (labeled 93 in FIG. 12). Said apparatus has electrical and thermal connectors (labeled 96, and 97 respectively) which are held in a mechanical connecting system (labeled 94). The entire apparatus has heat dissipative radiator (labeled 95).

The purpose of the device receptor apparatus is to integrate the three (or more) CAM units. The three cathodic connectors are connected to the control apparatus. However, the thermal connections (labeled 97) are used to couple said units together. The damage or rundown of one CAM unit is thus easily exchangeable by replacement with a functioning one.

FIG. 13 is a crossectional drawing of a lamellar CAM reactor. This device has two orthogonal applied electric fields. The first (labeled E-field number 1 in the figure) is that which is applied to charge the palladium with deuterons. The second applied electric field intensity is delivered after full charging has been achieved. In the figure the anode and cathode are labeled as 7 and 1. The electrolyte solution or gel is labeled as 6. The connections for the first electric field are labeled as 81 and 82. The connections for the second electric field are labeled as 85 and 86. The mechanical casing is labeled 20. The deuteron impermeable barrier is comb-shaped in this preferred configuration, and is labeled 55 in FIG. 13. The cathode in this preferred configuration is divided into parallel slabs. Between these slabs alternate deuteron-impermeable barriers. Application of the second electric field causes the deuterons already loaded in the cathode to redistribute, but the deuteron-impermeable barrier(s) act to enhance the desired reactions.

The 4-terminal CAM device shown in FIG. 13 does not show, for simplicity, the thermal transfer equipment or these parts needed for superassembly as described above.

Turning to FIG. 14 which shows three lamellar CAM reactors. Each device is equipped with orthogonal applied electric fields. The second applied electric field intensity is delivered after full charging. Each reactor is labeled as 90 in FIG. 14, but similar to what is shown in FIG. 13. These devices each contain a cathodes (labeled 1), intradevice gel containing lithium and palladium deuteroxide (labeled 6), and anode (labeled 7). These CAM devices are inserted, similar to a fuse onto a holding board (not shown), held in place by clips (labeled 102). The three CAM device are shown connected to a microprocessor control system (labeled 110). Said apparatus has an electrical bus to connect the anodes (labeled 105) which are connected to the anodic connectors (labeled 82). Said apparatus has an electrical bus to connect the cathodes (labeled 106 and 107) which are connected to the cathodic connectors (not labeled in the figure). The cathodic system buses (106 and 107) are electrically shorted together during the deuterium charging.

Said apparatus has a thermal bus (labeled 107) connected to the heat pipes (labeled 70) which are held in a mechanical connecting system (labeled 20). The entire apparatus has a heat dissipative system which is not shown.

The purpose of the receptor apparatus is first to integrate the three (or more) CAM units. The three cathodic connectors are connected to the control apparatus. However, after loading the cathodes, the cathodic buses (106 and 107) are separated and a second electric potential is supplied between these two buses. The result is the second applied electric field which is shown in FIG. 13, but not in FIG. 14. The result is the piling up of deuterium at the deuteron-impermeable barriers (labeled 55 in FIG. 14). The energy is directed out via the heat pipes (70) and the thermal bus (107). The damage or rundown of one CAM unit is thus easily exchanged by replacement with a functional one.

FIG. 15 is a crossectional drawing of a device used to activate a CAM reactor. The cathode is labeled 1. The solution or gel is labeled as 6. The mechanical casing is labeled 20. The deuteron impermeable barrier is labeled 55. In the figure the anode and the solution are not shown, because the cathode is axially loaded. The CAM device shown in FIG. 15 does not show, for simplicity, the thermal transfer equipment. External structures labeled 110 and 120 are near circumferential in location to the casing (20), and are used to squeeze the CAM reactor. The resultant pressure causes catastrophic desaturation. Also not shown in the figure are temperature control systems which can also activate the reaction.

Turning to FIG. 16, shown are three pressure-activated CAM reactors. Each reactor (un-labelled) is similar to that shown in FIG. 13. These devices each contain a cathode (labeled 1), heat pipes (labeled 70), expansion barrier (40), deuteron diffusion barrier (labeled 50), external casing (20), and thermomechanical connector (labeled 130) for assembling the heat pipes (70) to the external thermal bus (140). The entire apparatus has a heat dissipative system which is not shown. Said apparatus has an electrical bus to connect the anodes (not shown), and an electrical bus to connect the cathodes (not shown). The CAM devices are inserted, similar to a fuse onto a holding board (150, 151 above and below the assembly), held in place by clips (not shown for simplicity). External structures labeled 110 and 120 are near-circumferential in location to the casing (20), and are used to squeeze the CAM reactor.

The resultant pressure causes catastrophic desaturation. The purpose of the receptor apparatus is to integrate the three (or more) CAM units, and to couple said devices to the control system. As before, damage or rundown of one CAM unit allows easy replacement by a functioning one.

FIG. 17 is another configuration of device which can be easily integrated into power and heat systems. It consists of a reactor as described above (cf. FIG. 13) which is arranged as a thick film device, located in a transistor-like header. The header (labeled as 200) is perforated by six (6) holes (not labeled) to accommodate insulators (labeled 210), through which six leads enter said header. The leads consist of electric leads (182, 185, 181, and 186), and two thermal connections (labeled 170 in FIG. 17). The electrical leads are connected to the thick film device. The anode (labeled 7) is connected to the anodic terminal (82) to which is bonded the "anodic" lead (labeled 182).

The cathode (unlabelled but located adjacent to its cathodic terminal labeled 81) is connected via the cathodic terminal (81) to the "cathodic" lead (181). The electrolyte is an electrolyte gel as discussed above (labeled 6). After loading the leads 185 and 186 are activated to drive the deuterons into the obstructing barriers (which alternate with the cathode). Thermal leads 170 are, for simplicity, not shown connected to the thermal bus which extracts the heat from the reactor.

FIG. 18 shows a CAM reactor with a modification to extract an isotopic nuclear fusion product (e.g. tritium) from said reactor rather than heat. The device shown in the figure has an axially loaded cathode (labeled 1). The anode is labeled 7, and the solution 6. The structural casing is labeled 20. The cathode and anode have electrical connections labeled 81, and 82, respectively.

The electrical connections to the FUSOR power supply are labeled 181 and 182. An expansion barrier (40) is shown.

An inhomogenous magnetic field intensity is applied by coil labeled 300 to one portion of the cathode (1). Said magnetic field is driven by the power supply (labeled 301) in the figure. The spatially inhomogenous magnetic field could also be created by a superconductor.

The cathode is loaded by the electrochemical drive system. The differential magnetic susceptibility between isotopic fuel and the nuclear fusion product is used to magnetically pump the product to and through the barrier labeled 350. At that location there is a buildup of the isotope with the larger magnetic susceptibility due to said differential magnetic susceptibility. The magnetic force resulting from the applied magnetic field is the derivative of the magnetic coenergy with respect to distance in the axial direction, and is proportional to the square of the current, the square of the number of turns in the coil (300), and said differential magnetic susceptibility.

The products are removed at the product barrier (labeled 350). If said isotopic product is of lower magnetic susceptibility, then the coil is moved toward the portion of the cathode near to the solution (6).

A two-stage method which involves a first stage of loading, and then, a second stage of sudden rapid ("catastrophic") flow of hydrogen within the metal.

An apparatus including a novel cathode, novel anode, and heat pipes, to improve reaction rates. An apparatus including means to extract products. An apparatus including intralelectrode barriers to obstruct the movement isotopic fuel.

Modification of the invention herein disclosed will occur to persons skilled in the art and all such modifications are deemed to be within the scope of the invention as defined by the appended claims.

What is claimed is:

1. A method of electrochemically loading a material with a hydrogen isotope, which includes:
    applying a power source to create an electric field between a cathode and an anode in a modified aqueous solution consisting of a gel containing lithium deuteroxide, palladium deuteroxide, and the hydrogen isotope;
    providing an inner thermal barrier pipe within and coaxial to the cathode;
    surrounding the exterior of the cathode with a deuteron-impermeable barrier;
    surrounding the deuteron-impermeable barrier with an expansion barrier;
    surrounding the expansion barrier with a structural support;
    increasing the temperature to a critical temperature for loading the maximum amount of hydrogen isotope without causing defects or dislocations in the cathode;
        wherein the cathode is coaxially-shaped, and consists of any one of a member of the following group: palladium, vanadium, tantalum, niobium, lanthanum, and cerium;
        wherein the anode consists of palladium and is cruciform-shaped.

2. The method of claim 1, wherein the cathode further comprises epoxy or tungsten microspheres.

3. The method of claim 1, where the additional step is taken of obstructing a diffusion flux by a by the deuteron-impermeable diffusion barrier located exterior to the cathode.

* * * * *